(12) United States Patent
Tasaki et al.

(10) Patent No.: US 12,432,226 B2
(45) Date of Patent: Sep. 30, 2025

(54) ATTACK ANALYSIS DEVICE, ATTACK ANALYSIS METHOD, AND NON-TRANSITORY COMPUTER-READABLE RECORDING MEDIUM

(71) Applicant: Panasonic Intellectual Property Corporation of America, Torrance, CA (US)

(72) Inventors: Hajime Tasaki, Osaka (JP); Takamitsu Sasaki, Osaka (JP); Takashi Ushio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 282 days.

(21) Appl. No.: 18/195,586

(22) Filed: May 10, 2023

(65) Prior Publication Data
US 2023/0283617 A1 Sep. 7, 2023

Related U.S. Application Data

(63) Continuation of application No. PCT/JP2021/025100, filed on Jul. 2, 2021.
(Continued)

(51) Int. Cl.
*H04L 9/40* (2022.01)

(52) U.S. Cl.
CPC ...... *H04L 63/1416* (2013.01); *H04L 63/1425* (2013.01); *H04L 63/1466* (2013.01)

(58) Field of Classification Search
CPC ............. H04L 63/1416; H04L 63/1425; H04L 63/1466
See application file for complete search history.

(56) References Cited

U.S. PATENT DOCUMENTS

2018/0316699 A1* 11/2018 David ................. H04L 63/1425
2018/0351980 A1* 12/2018 Galula ................. H04W 12/12
(Continued)

FOREIGN PATENT DOCUMENTS

JP 2010-152773 7/2010
JP 2015-26252 2/2015
(Continued)

OTHER PUBLICATIONS

International Search Report (ISR) issued on Sep. 14, 2021 in International (PCT) Application No. PCT/JP2021/025100.

*Primary Examiner* — Robert B Leung
*Assistant Examiner* — Alan L Kong
(74) *Attorney, Agent, or Firm* — Wenderoth, Lind & Ponack, L.L.P.

(57) ABSTRACT

An attack analysis device includes: an obtainer that obtains in-vehicle network information indicating a configuration of an in-vehicle network including a plurality of external communication interfaces and a plurality of control Electronic Control Units (ECUs), and anomaly detection information indicating a result of detecting an anomaly in at least one node in the in-vehicle network; an attack path estimator that, based on the in-vehicle network information and the anomaly detection information, estimates an attack path in an attack on the in-vehicle network, the attack path including an entry point indicating an external communication interface that is a point of intrusion into the in-vehicle network in the attack and an attack target indicating a control ECU that is a target of the attack; and an outputter that outputs the attack path.

5 Claims, 26 Drawing Sheets

Related U.S. Application Data

(60) Provisional application No. 63/116,430, filed on Nov. 20, 2020.

(56) References Cited

U.S. PATENT DOCUMENTS

| | | | |
|---|---|---|---|
| 2020/0097663 A1* | 3/2020 | Sato | G06F 21/577 |
| 2020/0143053 A1* | 5/2020 | Gutierrez | G06F 21/554 |
| 2020/0242247 A1* | 7/2020 | Morita | G06F 11/0763 |
| 2020/0244691 A1* | 7/2020 | Veeramany | H04L 63/0236 |
| 2020/0296015 A1 | 9/2020 | Imamoto | |
| 2020/0304534 A1* | 9/2020 | Rakesh | H04L 63/1433 |
| 2021/0344700 A1 | 11/2021 | Ueno et al. | |
| 2021/0397702 A1 | 12/2021 | Amano et al. | |
| 2022/0407873 A1* | 12/2022 | Morita | H04L 67/12 |

FOREIGN PATENT DOCUMENTS

| | | |
|---|---|---|
| JP | 2019-174426 | 10/2019 |
| JP | 2020-119090 | 8/2020 |
| JP | 2020-150430 | 9/2020 |
| WO | 2020/189668 | 9/2020 |

* cited by examiner

FIG. 4

| Classification | Node | IDS timestamp | Anomaly detection | Anomaly detection score |
|---|---|---|---|---|
| Entry node | External communication IF_A | — | No anomaly detected | — |
| | External communication IF_B | 2020/08/30 10:32:10 | Anomaly detected | 60 |
| | External communication IF_C | 2020/08/30 10:32:30 | Anomaly detected | 80 |
| Intermediate node | Gateway | 2020/08/30 10:33:05 | Anomaly detected | 80 |
| | ECU_A | 2020/08/30 10:33:50 | Anomaly detected | 70 |
| | ECU_B | 2020/08/30 10:34:00 | Anomaly detected | 80 |
| Target node | ECU_C | — | No anomaly detected | — |
| | ECU_D | — | No anomaly detected | — |

FIG. 5

| Risk | Classification | Sub-risk | External communication event | Prioritized path |
|---|---|---|---|---|
| 3 | Establishment of external communication | 3 | Connected to new IP address | Path including TCU |
| | | 2 | External device connected to OBD port | Path including OBD port |
| | | 1 | External device connected to navigation system | Path including infotainment system |
| 2 | Internal software update | 2 | Third-party app installed | Path including device executing third-party app |
| | | 1 | Third-party app updated | Path including device executing third-party app |
| 1 | Vehicle charging | 1 | Vehicle charging started | Path including communication device for charging |

FIG. 6

| Date/time | External communication event ID | External communication IF ID | External communication event | External communication event risk |
|---|---|---|---|---|
| 2020/08/30 10:32:00 | ComEvent001 | IF01 | External device connected to OBD port | 3-2 |
| 2020/08/30 10:33:00 | ComEvent002 | IF01 | External device connected to navigation system | 3-1 |
| 2020/08/30 10:34:00 | ComEvent003 | IF02 | Connected to new IP address | 3-3 |
| 2020/08/30 10:35:00 | ComEvent004 | IF02 | Third-party app installed | 2-2 |
| 2020/08/30 10:36:00 | ComEvent005 | IF02 | Third-party app updated | 2-1 |
| 2020/08/30 10:37:00 | ComEvent006 | IF03 | Vehicle charging started | 1-1 |
| ... | ... | ... | ... | ... |

FIG. 7

| Risk | Classification | Sub-risk | Vehicle control event | Prioritized path |
|---|---|---|---|---|
| 3 | Control instruction | 1 | Acceleration/steering/deceleration instruction issued | Bus connected to travel control ECU |
| 2 | ADAS function | 1 | ADAS system switched on/off | Bus connected to ADAS control ECU |
| 1 | Vehicle function | 4 | Door locked/unlocked | Bus connected to lock control ECU/chassis bus |
| | | 3 | Directional indicator turned on | Bus connected to directional indicator control ECU |
| | | 2 | Air conditioner operation changed | Bus connected to air conditioner control ECU |
| | | 1 | Windshield wipers operated | Bus connected to windshield wiper control ECU/body bus |

FIG. 8

| Date/time | Vehicle control event ID | ECU ID | Vehicle control event | Vehicle control event risk |
|---|---|---|---|---|
| 2020/08/30 10:30:15 | CarEvent004 | ECU 02 | Air conditioner operation changed | 1-2 |
| 2020/08/30 10:32:00 | CarEvent002 | ECU 01 | ADAS system switched on/off | 2-1 |
| 2020/08/30 10:33:55 | CarEvent001 | ECU 01 | Acceleration/steering/deceleration instruction issued | 3-1 |
| 2020/08/30 10:34:20 | CarEvent003 | ECU 02 | Door locked/unlocked | 1-4 |
| 2020/08/30 10:36:00 | CarEvent005 | ECU 03 | Directional indicator turned on | 1-3 |
| 2020/08/30 10:38:00 | CarEvent006 | ECU 03 | Windshield wipers operated | 1-1 |
| ... | ... | ... | ... | ... |

FIG. 10

Anomaly notification ID: Alert001

| Classification | Node | Timestamp | Anomaly detection | Anomaly detection score | Vehicle control event | Estimation result | Risk | Attack path |
|---|---|---|---|---|---|---|---|---|
| | | | | | | | | Attack path 1 |
| Entry node | External communication IF_A | — | No anomaly detected | — | None | | | |
| Entry node | External communication IF_B | 2020/08/30 10:32:10 | Anomaly detected | 60 | None | | | |
| Entry node | External communication IF_C | 2020/08/30 10:32:30 | Anomaly detected | 80 | ComEvent01 | | | |
| Intermediate node | Gateway | 2020/08/30 10:33:05 | Anomaly detected | 80 | — | | | |
| | ECU_A | 2020/08/30 10:33:50 | Anomaly detected | 70 | CarEvent01 | | | |
| | ECU_B | 2020/08/30 10:34:00 | Anomaly detected | 80 | None | | | |
| Target node | ECU_C | — | No anomaly detected | — | None | | | |
| | ECU_D | — | No anomaly detected | — | None | | | |
| Attack path confidence level | | | | | | | | |

FIG. 11

| Anomaly notification ID | Attack path | Attack path confidence level | Entry point | Entry point risk | Attack target | Attack target risk |
|---|---|---|---|---|---|---|
| Alert001 | External communication IF_A → IDS_A → ECU_A | 3 | External communication IF_A | 3 | ECU_A | 3 |
| Alert002 | External communication IF_A → IDS_B → ECU_B | 3.5 | External communication IF_A | 4 | ECU_B | 3 |
| Alert003 | External communication IF_A → IDS_A → ECU_A | 5 | External communication IF_A | 5 | ECU_A | 5 |
| Alert004 | External communication IF_A → IDS_A → ECU_A | 4 | External communication IF_A | 4 | ECU_A | 4 |
| Alert004 | External communication IF_B → IDS_A → ECU_A | 5 | External communication IF_B | 5 | ECU_A | 5 |

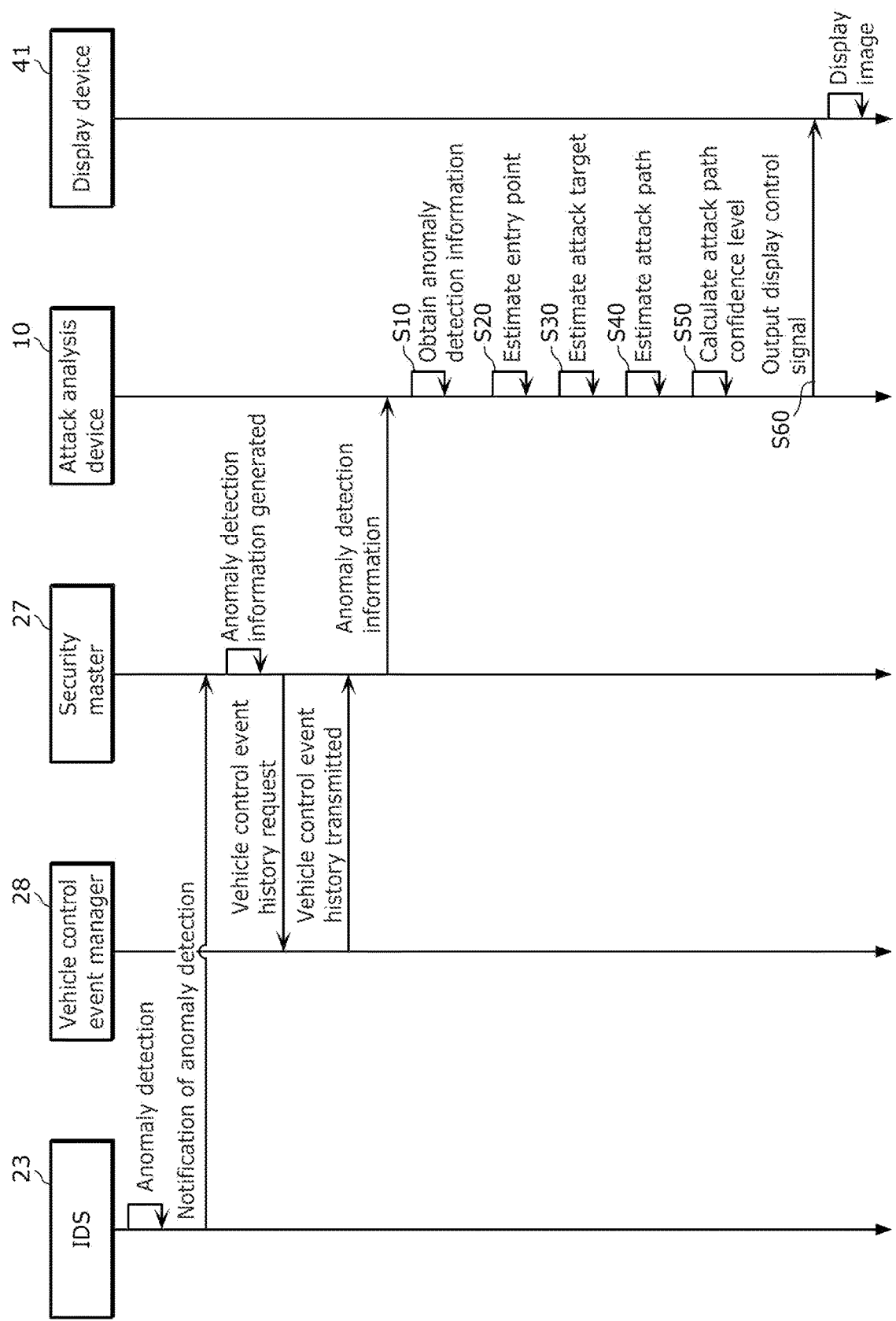

FIG. 18

| Anomaly notification ID | | | | Alert001 | | | | | |
|---|---|---|---|---|---|---|---|---|---|
| Classification | Node | Timestamp | Anomaly detection | Anomaly detection score | Vehicle control event | Estimation result | Risk | Attack path | |
| Entry node | External communication IF_A | — | No anomaly detected | — | None | No attack | 0 | | Attack path 1 |
| | External communication IF_B | 2020/08/30 10:32:10 | Anomaly detected | 60 | None | Anomaly detected | 4 | | |
| | External communication IF_C | 2020/08/30 10:32:30 | Anomaly detected | 80 | ComEvent01 | Anomaly detected (attack risk high) | 5 | | |
| Intermediate node | Gateway | 2020/08/30 10:33:05 | Anomaly detected | 80 | — | — | — | | |
| | ECU_A | 2020/08/30 10:33:50 | Anomaly detected | 70 | CarEvent01 | Anomaly detected (attack risk high) | 5 | | |
| | ECU_B | 2020/08/30 10:34:00 | Anomaly detected | 80 | None | Anomaly detected | 4 | | |
| Target node | ECU_C | — | No anomaly detected | — | None | No attack | 0 | | |
| | ECU_D | — | No anomaly detected | — | None | No attack | 0 | | |

Attack path confidence level

FIG. 21

| Anomaly notification ID | | | Alert001 | | | | | |
|---|---|---|---|---|---|---|---|---|
| Classification | Node | Timestamp | Anomaly detection | Anomaly detection score | Vehicle control event | Estimation result | Risk | Attack path / Attack path 1 |
| Entry node | External communication IF_A | — | No anomaly detected | — | None | No attack | 0 | — |
| | External communication IF_B | 2020/08/30 10:32:10 | Anomaly detected | 60 | None | Anomaly detected | 4 | — |
| | External communication IF_C | 2020/08/30 10:32:30 | Anomaly detected | 80 | ComEvent01 | Anomaly detected (attack risk high) | 5 | ● |
| Intermediate node | Gateway | 2020/08/30 10:33:05 | Anomaly detected | 80 | — | — | — | ● |
| | ECU_A | 2020/08/30 10:33:50 | Anomaly detected | 70 | CarEvent01 | Anomaly detected (attack risk high) | 5 | ● |
| | ECU_B | 2020/08/30 10:34:00 | Anomaly detected | 80 | None | Anomaly detected | 4 | — |
| Target node | ECU_C | — | No anomaly detected | — | None | No attack | 0 | — |
| | ECU_D | — | No anomaly detected | — | None | No attack | 0 | — |
| Attack path confidence level | | | | | | | | 5 |

FIG. 22

Anomaly notification ID: Alert001

| Classification | Node | Timestamp | Anomaly detection | Anomaly detection score | Vehicle control event | Estimation result | Risk | Attack path 1 | Attack path 2 |
|---|---|---|---|---|---|---|---|---|---|
| Entry node | External communication IF_A | — | No anomaly detected | — | None | No attack | 0 | — | — |
| Entry node | External communication IF_B | 2020/08/30 10:32:10 | Anomaly detected | 60 | None | Anomaly detected | 4 | — | ● |
| Entry node | External communication IF_C | 2020/08/30 10:32:30 | Anomaly detected | 80 | ComEvent01 | Anomaly detected (attack risk high) | 5 | ● | — |
| Intermediate node | Gateway | 2020/08/30 10:33:05 | Anomaly detected | 80 | — | — | — | ● | ● |
| Intermediate node | ECU_A | 2020/08/30 10:33:50 | Anomaly detected | 70 | CarEvent01 | Anomaly detected (attack risk high) | 5 | ● | ● |
| Intermediate node | ECU_B | 2020/08/30 10:34:00 | Anomaly detected | 80 | None | Anomaly detected | 4 | — | — |
| Target node | ECU_C | — | No anomaly detected | — | None | No attack | 0 | — | — |
| Target node | ECU_D | — | No anomaly detected | — | None | No attack | 0 | — | — |
| Attack path confidence level | | | | | | | | 4 | 4 |

ATTACK ANALYSIS DEVICE, ATTACK ANALYSIS METHOD, AND NON-TRANSITORY COMPUTER-READABLE RECORDING MEDIUM

CROSS REFERENCE TO RELATED APPLICATIONS

This is a continuation application of PCT International Application No. PCT/JP2021/025100 filed on Jul. 2, 2021, designating the United States of America, which is based on and claims priority of U.S. Provisional Patent Application No. 63/116,430 filed on Nov. 20, 2020. The entire disclosures of the above-identified applications, including the specifications, drawings and claims are incorporated herein by reference in their entirety.

FIELD

The present disclosure relates to an attack analysis device that analyzes cyber attacks on a network.

BACKGROUND

Techniques are known which analyze cyber attacks (also called simply "attacks" hereinafter) on in-vehicle networks installed in vehicles (see PTL 1, for example).

CITATION LIST

Patent Literature

PTL 1: Japanese Unexamined Patent Application Publication No. 2015-026252

SUMMARY

Technical Problem

When an attack has been carried out on an in-vehicle network, it is desirable to estimate the attack path of that attack, which includes an entry point, which is the point of intrusion into the in-vehicle network in the attack, and an attack target, which is the target of the attack.

Accordingly, an object of the present disclosure is to provide an attack analysis device and the like capable of estimating an attack path, including an entry point and an attack target, in an attack on an in-vehicle network.

Solution to Problem

An attack analysis device according to one aspect of the present disclosure includes: an obtainer that obtains in-vehicle network information indicating a configuration of an in-vehicle network including a plurality of external communication interfaces and a plurality of control Electronic Control Units (ECUs), and anomaly detection information indicating a result of detecting an anomaly in at least one node in the in-vehicle network; an attack path estimator that, based on the in-vehicle network information and the anomaly detection information, estimates an attack path in an attack on the in-vehicle network, the attack path including an entry point indicating an external communication interface that is a point of intrusion into the in-vehicle network in the attack and an attack target indicating a control ECU that is a target of the attack; and an outputter that outputs the attack path.

An attack analysis method according to one aspect of the present disclosure is an attack analysis method executed by a computer, the attack analysis method including: obtaining in-vehicle network information indicating a configuration of an in-vehicle network including a plurality of external communication interfaces and a plurality of control ECUs, and anomaly detection information indicating a result of detecting an anomaly in at least one node in the in-vehicle network; estimating, based on the in-vehicle network information and the anomaly detection information, an attack path in an attack on the in-vehicle network, the attack path including an entry point indicating an external communication interface that is a point of intrusion into the in-vehicle network in the attack and an attack target indicating a control ECU that is a target of the attack; and outputting the attack path.

A non-transitory computer-readable recording medium according to one aspect of the present disclosure is a non-transitory computer-readable recording medium having recorded thereon a program for causing a computer to execute attack analysis processing, the attack analysis processing including: obtaining in-vehicle network information indicating a configuration of an in-vehicle network including a plurality of external communication interfaces and a plurality of control ECUs, and anomaly detection information indicating a result of detecting an anomaly in at least one node in the in-vehicle network; estimating, based on the in-vehicle network information and the anomaly detection information, an attack path in an attack on the in-vehicle network, the attack path including an entry point indicating an external communication interface that is a point of intrusion into the in-vehicle network in the attack and an attack target indicating a control ECU that is a target of the attack; and outputting the attack path.

Advantageous Effects

According to the attack analysis device and the like according to one aspect of the present disclosure, an attack analysis device and the like capable of estimating an attack path, including an entry point and an attack target, in an attack on an in-vehicle network are provided.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 4 is a schematic diagram illustrating an example of an anomaly detection list according to an embodiment.

FIG. 5 is a schematic diagram illustrating an example of an external communication event list according to an embodiment.

FIG. 6 is a schematic diagram illustrating an example of an external communication event history according to an embodiment.

FIG. 7 is a schematic diagram illustrating an example of a vehicle control event list according to an embodiment.

FIG. 8 is a schematic diagram illustrating an example of a vehicle control event history according to an embodiment.

FIG. 10 is a schematic diagram illustrating an example of the configuration of an attack path estimation result table according to an embodiment.

FIG. 11 is a schematic diagram illustrating an example of an attack path history according to an embodiment.

FIG. 12 is a sequence chart illustrating attack monitoring processing according to an embodiment.

FIG. 18 is a schematic diagram illustrating an example of the configuration of an attack path estimation result table according to an embodiment.

FIG. 21 is a schematic diagram illustrating an example of the configuration of an attack path estimation result table according to an embodiment.

FIG. 22 is a schematic diagram illustrating an example of the configuration of an attack path estimation result table according to an embodiment.

DESCRIPTION OF EMBODIMENTS

Figure 1:
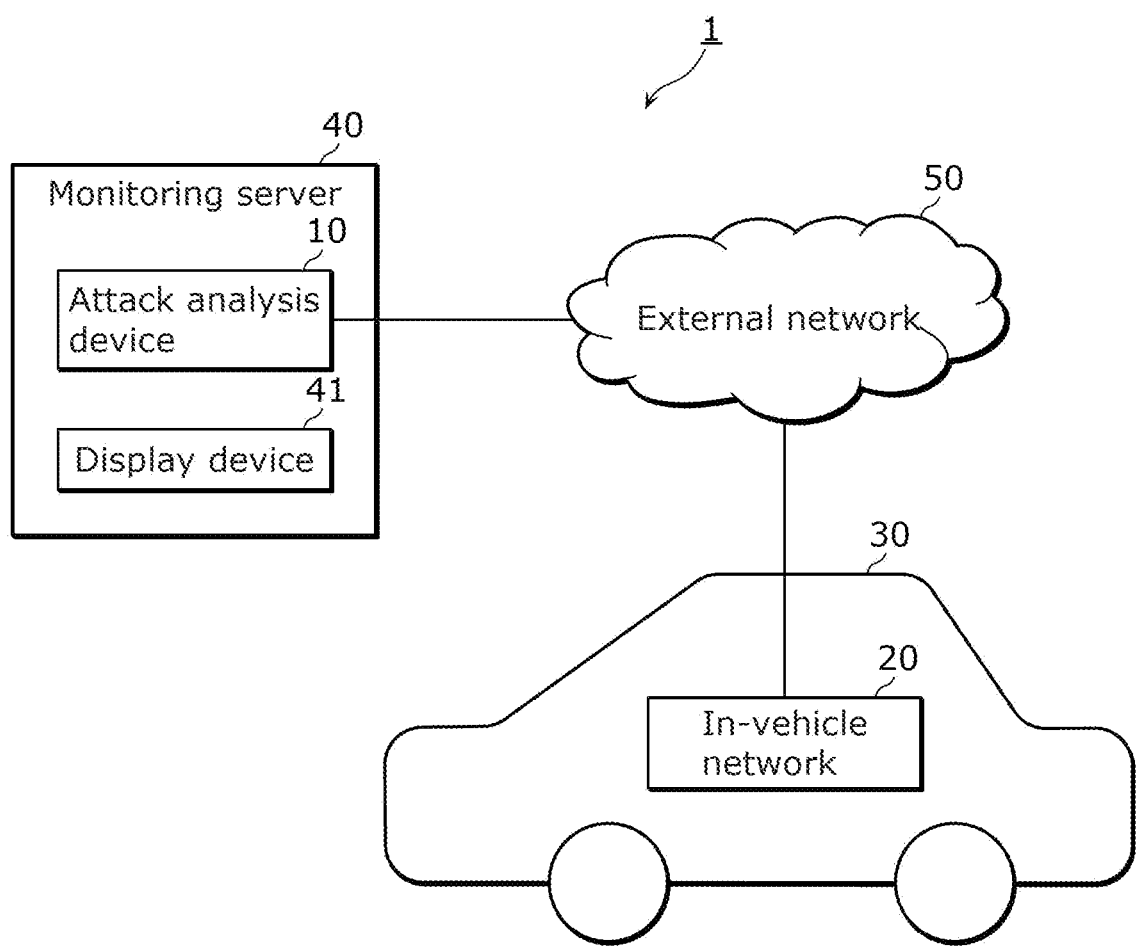
FIG. 1 is a block diagram illustrating an example of the configuration of an attack monitoring system according to an embodiment.

Circumstances Leading to One Aspect of Present Disclosure

The inventors thought that to analyze an attack on an in-vehicle network installed in a vehicle, such as by analyzing the attack, verifying the attack against past cases, and the like, it is important to estimate the attack path of the attack, including the entry point, which refers to an external communication interface used as the point of intrusion into the in-vehicle network, and the attack target, which indicates the control ECU that is the target of the attack. This is because the costs of the analysis work can be reduced if the attack path can be estimated.

On the other hand, anomaly detection results detected at each node of the in-vehicle network may include undetected anomalies, false detections of anomalies, and the like, and there are therefore cases where it is difficult to estimate the attack path only from anomaly detection information indicating the anomaly detection results detected at each node of the in-vehicle network.

The inventors therefore diligently studied and experimented with methods for estimating attack paths with relatively high accuracy.

As a result, the inventors discovered that an attack path can be estimated with relatively high accuracy by using the configuration of the in-vehicle network and anomaly detection information.

Based on this knowledge, the inventors made further studies and experiments, and arrived at the attack analysis device, attack analysis method, and non-transitory computer-readable recording medium according to the present disclosure as described below.

An attack analysis device according to one aspect of the present disclosure includes: an obtainer that obtains in-vehicle network information indicating a configuration of an in-vehicle network including a plurality of external communication interfaces and a plurality of control Electronic Control Units (ECUs), and anomaly detection information indicating a result of detecting an anomaly in at least one node in the in-vehicle network; an attack path estimator that, based on the in-vehicle network information and the anomaly detection information, estimates an attack path in an attack on the in-vehicle network, the attack path including an entry point indicating an external communication interface that is a point of intrusion into the in-vehicle network in the attack and an attack target indicating a control ECU that is a target of the attack; and an outputter that outputs the attack path.

According to the attack analysis device configured as described above, when an attack is carried out on the in-vehicle network, the attack path can be estimated with relatively high accuracy by using the configuration of the in-vehicle network, indicated by the in-vehicle network information, and the anomaly detection information. Thus, according to the attack analysis device configured as described above, an attack path including the entry point and the attack target of the attack on the in-vehicle network can be estimated.

Additionally, the obtainer may further obtain an external communication event history indicating a history of communication events between the in-vehicle network and outside the in-vehicle network, and a vehicle control event history indicating a history of vehicle control events by a vehicle in which the in-vehicle network is installed. The attack analysis device may further include: an entry point estimator that estimates the entry point based on the in-vehicle network information, the anomaly detection information, and the external communication event history; and an attack target estimator that estimates the attack target based on the in-vehicle network information, the anomaly detection information, and the vehicle control event history. The attack path estimator may estimate the attack path based on the entry point estimated by the entry point estimator and the attack target estimated by the attack target estimator.

The attack analysis device configured as described above can estimate the entry point more accurately based on the in-vehicle network information, the anomaly detection information, and the external communication event history, and can estimate the attack target more accurately based on the in-vehicle network information, the anomaly detection information, and the vehicle control event history. Thus, according to the attack analysis device, the attack path can be estimated more accurately.

Additionally, for each of the plurality of external communication interfaces, the entry point estimator may calculate an entry point risk indicating a confidence level of each of the plurality of external communication interfaces being the entry point, and estimate the entry point based on each entry point risk calculated; and for each of the plurality of control ECUs, the attack target estimator may calculate an attack target risk indicating a confidence level of each of the plurality of control ECUs being the attack target, and estimates the attack target based on each attack target risk calculated.

Accordingly, the confidence level as an entry point, calculated for each of the plurality of external communication interfaces, can be reflected in the estimation of the entry point, and the confidence level as an attack target, calculated for each of the plurality of control ECUs, can be reflected in the estimation of the attack target.

Additionally, the attack analysis device may further include an attack path confidence level calculator that, based on the entry point risk of the entry point calculated by the entry point estimator and the attack target risk of the attack target calculated by the attack target estimator, calculates an attack path confidence level indicating a confidence level of the attack path estimated by the attack path estimator being the attack path, and the outputter may further output the attack path confidence level.

Through this, information indicating the confidence level as the attack path can be output for the attack path which is output.

Additionally, the outputter may include a display controller that outputs, to a display device, a display control signal including the attack path, the display control signal controlling the display device to display a configuration diagram indicating the configuration of the in-vehicle network and display the attack path using a different method from a method used to display another part of the configuration diagram.

Accordingly, a user using the attack analysis device can visually recognize the attack path.

An attack analysis method according to one aspect of the present disclosure is an attack analysis method executed by a computer, the attack analysis method including: obtaining in-vehicle network information indicating a configuration of an in-vehicle network including a plurality of external communication interfaces and a plurality of control ECUs, and anomaly detection information indicating a result of detecting an anomaly in at least one node in the in-vehicle network; estimating, based on the in-vehicle network information and the anomaly detection information, an attack path in an attack on the in-vehicle network, the attack path including an entry point indicating an external communication interface that is a point of intrusion into the in-vehicle network in the attack and an attack target indicating a control ECU that is a target of the attack; and outputting the attack path.

According to the attack analysis method, when an attack is carried out on the in-vehicle network, the attack path can be estimated with relatively high accuracy by using the configuration of the in-vehicle network, indicated by the in-vehicle network information, and the anomaly detection information. Thus, according to the attack analysis method, an attack path including the entry point and the attack target of the attack on the in-vehicle network can be estimated.

A non-transitory computer-readable recording medium according to one aspect of the present disclosure is a non-transitory computer-readable recording medium having recorded thereon a program for causing a computer to execute attack analysis processing, the attack analysis processing including: obtaining in-vehicle network information indicating a configuration of an in-vehicle network including a plurality of external communication interfaces and a plurality of control ECUs, and anomaly detection information indicating a result of detecting an anomaly in at least one node in the in-vehicle network; estimating, based on the in-vehicle network information and the anomaly detection information, an attack path in an attack on the in-vehicle network, the attack path including an entry point indicating an external communication interface that is a point of intrusion into the in-vehicle network in the attack and an attack target indicating a control ECU that is a target of the attack; and outputting the attack path.

According to the non-transitory computer-readable recording medium, when an attack is carried out on the in-vehicle network, the attack path can be estimated with relatively high accuracy by using the configuration of the in-vehicle network, indicated by the in-vehicle network information, and the anomaly detection information. Thus, according to the non-transitory computer-readable recording medium, an attack path including the entry point and the attack target of the attack on the in-vehicle network can be estimated.

A specific example of the attack analysis device according to one aspect of the present disclosure will be described hereinafter with reference to the drawings. Each of the following embodiments describes a specific example of the present disclosure. As such, the numerical values, shapes, constituent elements, arrangements and connection states of constituent elements, steps, orders of steps, and the like in the following embodiments are merely examples, and are not intended to limit the present disclosure. Additionally, the drawings are schematic diagrams, and are not necessarily exact illustrations. Configurations that are substantially the same are given the same reference signs in the drawings, and redundant descriptions will be omitted or simplified.

Embodiment

An attack analysis device according to an embodiment will be described hereinafter. This attack analysis device is a device that estimates an attack path in an attack on an in-vehicle network installed in a vehicle.

Configuration

FIG. 1 is a block diagram illustrating an example of the configuration of attack monitoring system 1 which uses attack analysis device 10 according to an embodiment to monitor attacks on in-vehicle network 20 installed in vehicle 30.

As illustrated in FIG. 1, attack monitoring system 1 is configured including monitoring server 40, vehicle 30, in-vehicle network 20, and external network 50.

Monitoring server 40 is what is known as a computer device, and includes a processor (not shown), a memory (not shown), a communication interface (not shown), a storage device (not shown), and a display (not shown).

Monitoring server 40 realizes attack analysis device 10 and display device 41 by the processor executing programs stored in the memory.

Vehicle 30 has a communication function, and is provided with in-vehicle network 20. Vehicle 30 is an automobile, for example.

External network 50 is a wide-area network such as the Internet, and includes attack analysis device 10 and in-vehicle network 20 as connection destinations.

Figure 2:
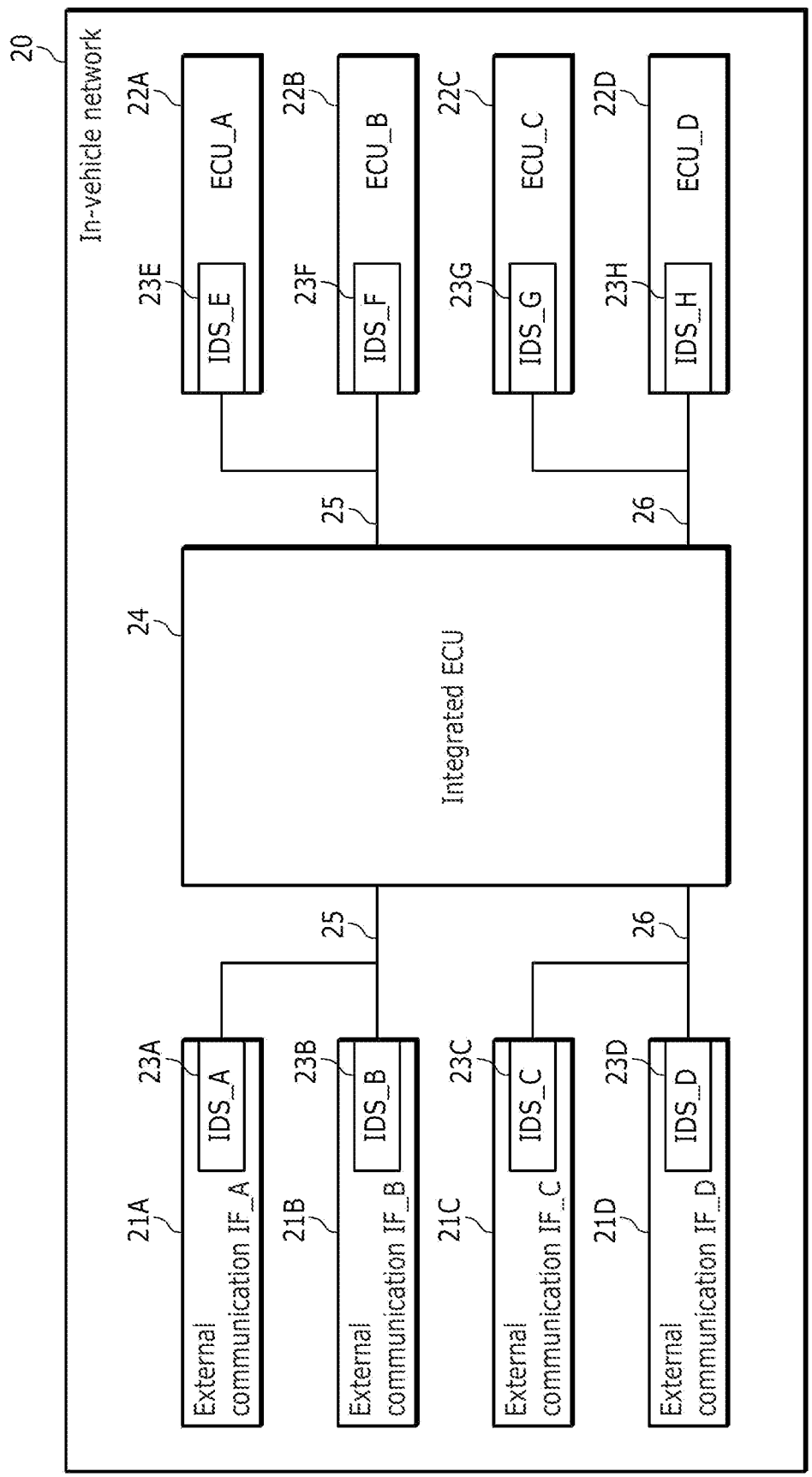
FIG. 2 is a block diagram illustrating an example of the configuration of an in-vehicle network according to an embodiment.

FIG. 2 is a block diagram illustrating an example of the configuration of in-vehicle network 20.

As illustrated in FIG. 2, in-vehicle network 20 is configured including a plurality of external communication interfaces, a plurality of control Electronic Control Units (ECUs), and integrated ECU 24.

Here, in FIG. 2, the plurality of external communication interfaces correspond to external communication IF_A 21A, external communication IF_B 21B, external communication IF_C 21C, and external communication IF_D 21D. Each of the plurality of external communication interfaces may also be referred to simply as "external communication IF 21" hereinafter. Furthermore, in FIG. 2, the plurality of control ECUs correspond to ECU_A 22A, ECU_B 22B, ECU_C 22C, and ECU_D 22D. Each of the plurality of control ECUs may also be referred to simply as "ECU 22" hereinafter.

The plurality of external communication IFs 21 may include, for example, a telematics communication unit (TCU; Telematic Control Unit), an in-vehicle infotainment system, an external application execution device, a communication device that communicates with a charging stand, an On-Board Diagnostics (OBD) port, and the like.

Each of the plurality of external communication IFs 21 includes an Intrusion Detection System (IDS) that detects an anomaly in that external communication IF 21. Here, external communication IF_A 21A includes IDS_A 23A, external communication IF_B 21B includes IDS_B 23B, external communication IF_C 21C includes IDS_C 23C, and external communication IF_D 21D includes IDS_D 23D.

The plurality of external communication IFs 21 are connected to integrated ECU 24 through Controller Area Network (CAN) 25 or Ethernet (registered trademark) 26.

The plurality of ECUs 22 may include, for example, a control ECU that controls the travel of vehicle 30, an Advanced Driver Assistance System (ADAS) control ECU that controls an ADAS, an air conditioner control ECU that controls an air conditioner, and the like.

Each ECU 22 includes an IDS that detects an anomaly in that ECU 22. Here, ECU_A 22A includes IDS_E 23E, ECU_B 22B includes IDS_F 23F, ECU_C 22C includes IDS_G 23G, and ECU_D 22D includes IDS_H 23H.

The plurality of ECUs 22 are connected to integrated ECU 24 through CAN 25 or Ethernet (registered trademark) 26.

Figure 3:
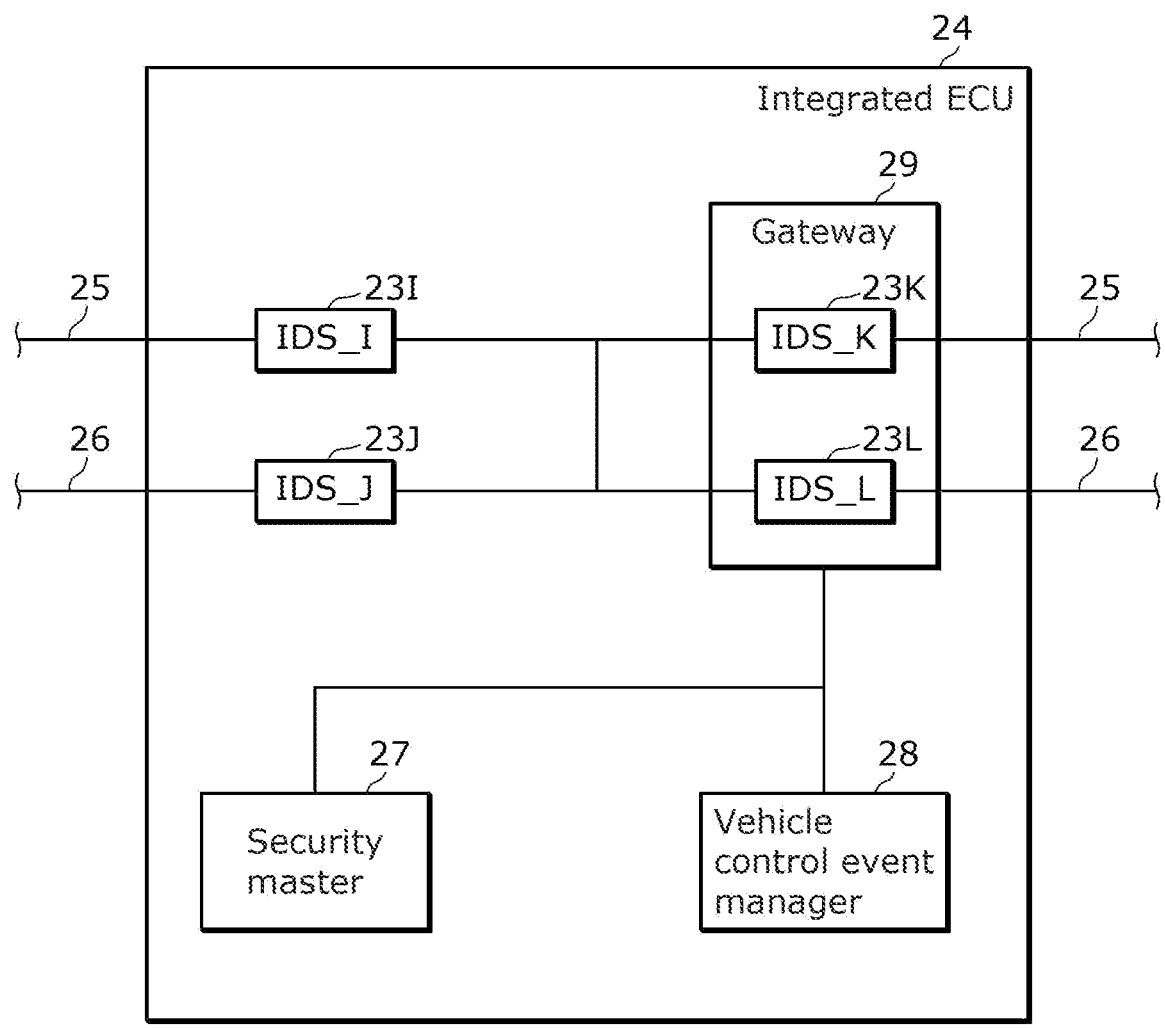
FIG. 3 is a block diagram illustrating an example of the configuration of an integrated ECU according to an embodiment.

FIG. 3 is a block diagram illustrating an example of the configuration of integrated ECU 24.

As illustrated in FIG. 3, integrated ECU 24 includes gateway 29, security master 27, vehicle control event manager 28, IDS_I 23I, and IDS_J 23J.

Integrated ECU 24 is what is known as a computer device, and includes a processor (not shown), a memory (not shown), and a communication interface (not shown).

Integrated ECU 24 realizes gateway 29, security master 27, and vehicle control event manager 28, as well as IDS_I 23I and IDS_J 23J which detect anomalies in integrated ECU 24, by using the processor to execute programs stored in the memory.

Gateway 29 includes IDS_K 23K and IDS_L 23L, which detect anomalies in gateway 29.

Each of the plurality of IDSs included in in-vehicle network 20 may also be referred to simply as "IDS 23" hereinafter.

Security master 27 generates anomaly detection information indicating an anomaly detection result detected in at least one node in in-vehicle network 20 when IDS 23 included in in-vehicle network 20 has detected an anomaly. Once the anomaly detection information is detected, security master 27 transmits the generated anomaly detection information to attack analysis device 10 along with in-vehicle network information indicating the configuration of in-vehicle network 20, a vehicle control event history (described later), and an external communication event history (described later).

Here, "node" refers to the plurality of external communication IFs 21, gateway 29, and the plurality of ECUs 22.

FIG. 4 is a schematic diagram illustrating an example of an anomaly detection list, which itself is an example of the anomaly detection information generated by security master 27.

As illustrated in FIG. 4, the anomaly detection list is a table which, for each node included in in-vehicle network 20, associates a classification of the node, a timestamp indicating the date and time at which an anomaly was detected by the IDS which detects anomalies for that node, whether or not an anomaly has been detected by the IDS which detects anomalies for that node, and an anomaly detection score output from the IDS which detects anomalies for that node. Here, the "anomaly detection score" is a score which indicates a degree of anomaly for the anomaly detected by the IDS, and is a score which increases in value as the degree of anomaly increases. The embodiment will be described assuming external communication IF 21 is classified as an entry node and ECU 22 is classified as a target node.

When one IDS 23 detects an anomaly, security master 27 generates the anomaly detection list for anomalies detected by IDSs 23 included in in-vehicle network 20 within predetermined period T1 (e.g., two minutes) starting from the detection.

When the same IDS 23 detects an anomaly multiple times within predetermined period T1, security master 27 may generate the anomaly detection list only for the first of those multiple anomalies, for example. This is because a series of successive attacks are to be handled as a single attack.

It can be seen, from the anomaly detection list illustrated in FIG. 4, that, for example, the IDS of external communication IF_B, which is classified as an entry node, detected an anomaly at 10:32:10 on Aug. 30, 2020, and that the anomaly detection score of the detected anomaly is 60.

Returning to FIG. 3, descriptions of integrated ECU 24 will be resumed.

Vehicle control event manager 28 stores a predefined external communication event list, a predefined vehicle control event list, and based on the stored external communication event list and vehicle control event list, generates, updates, and manages an external communication event history, which indicates a history of communication events between in-vehicle network 20 and the exterior, and a vehicle control event history, which indicates a history of vehicle control events performed by vehicle 30.

FIG. 5 is a schematic diagram illustrating an example of the external communication event list stored by vehicle control event manager 28.

As illustrated in FIG. 5, the external communication event list is a table which, for each of external communication events indicating communication events between in-vehicle network 20 and the exterior, associates a classification of the external communication event, a risk and a sub-risk indicating a degree of risk of a cyber attack stemming from that external communication event, and a prioritized path, which is a comment regarding that external communication event. Here, the "risk" and "sub-risk" are both scores which increase in value as the degree of risk of a cyber attack increases.

It can be seen, from the external communication event list illustrated in FIG. 5, that, for example, the external communication event "connected to new IP address", which is classified as "establishment of external communication", has a risk of 3 and a sub-risk of 3.

FIG. 6 is a schematic diagram illustrating an example of the external communication event history generated, updated, and managed by vehicle control event manager 28.

As illustrated in FIG. 6, the external communication event history is a table which, for each external communication event that occurs, associates the date and time when the external communication event occurred, an external communication event ID identifying that external communication event, an external communication IF ID identifying external communication IF 21 which communicated with the exterior in that external communication event, and an external communication event risk indicating the risk of that external communication event. Here, the external communication event risk is expressed as a combination of the risk and the sub-risk in the external communication event list.

It can be seen, from the external communication event history illustrated in FIG. 6, that, for example, the external communication event "external device connected to OBD port" is an event which occurred at 10:32:00 on Aug. 30, 2020, was communicated with the exterior over external communication IF 21 identified by an external communication IF ID of "IF01", and which has an external communication event risk of 3-2.

FIG. 7 is a schematic diagram illustrating an example of the vehicle control event list stored by vehicle control event manager 28.

As illustrated in FIG. 7, the vehicle control event list is a table which, for each vehicle control event indicating a vehicle control event performed by vehicle 30, associates the classification of that vehicle control event, the risk and sub-risk indicating the severity of the threat to the safety of vehicle 30 if that vehicle control event is the result of a cyber attack, and the "prioritized path", which is a comment regarding that vehicle control event. Here, the "risk" and "sub-risk" are both scores which increase in value as the severity of the threat to the safety increases.

It can be seen, from the vehicle control event list illustrated in FIG. 7, that, for example, the vehicle control event "acceleration/steering/deceleration instruction issued", which is classified as a "control instruction", has a risk of 3 and a sub-risk of 1.

FIG. 8 is a schematic diagram illustrating an example of the vehicle control event history generated, updated, and managed by vehicle control event manager 28.

As illustrated in FIG. 8, the vehicle control event history is a table which, for each vehicle control event that has occurred, associates the date and time when that vehicle control event occurred, a vehicle control event ID identifying that vehicle control event, an ECU ID identifying ECU 22 which caused that vehicle control event to occur, and a vehicle control event risk indicating the risk of that vehicle control event. Here, the vehicle control event risk is expressed as a combination of the risk and the sub-risk in the vehicle control event list.

It can be seen, from the vehicle control event history illustrated in FIG. 8, that, for example, the vehicle control event "air conditioner operation changed" is an event which occurred at 10:30:15 on Aug. 30, 2020, occurred in ECU 22 identified by an ECU ID of "ECU02", and which has a vehicle control event risk of 1-2.

Returning to FIG. 3, descriptions of integrated ECU 24 will be resumed.

As described earlier, when IDS 23 included in in-vehicle network 20 detects an anomaly, security master 27 generates the anomaly detection information and transmits the generated anomaly detection information to attack analysis device 10 along with the in-vehicle network information, the vehicle control event history, and the external communication event history.

At this time, security master 27 does not absolutely have to transmit the entire external communication event history managed by vehicle control event manager 28 to attack analysis device 10. The descriptions here will assume that security master 27 transmits, to attack analysis device 10, an external communication event history of communication events between in-vehicle network 20 and the exterior in predetermined period T2 before and after the anomaly was detected (e.g., five minutes before the detection and five minutes after the detection, for a total of ten minutes). Additionally, at this time, security master 27 does not absolutely have to transmit the entire vehicle control event history managed by vehicle control event manager 28 to attack analysis device 10. The descriptions here will assume that security master 27 transmits, to attack analysis device 10, a vehicle control event history of vehicle control events performed by vehicle 30 in predetermined period T2 before and after the anomaly was detected.

Figure 9:
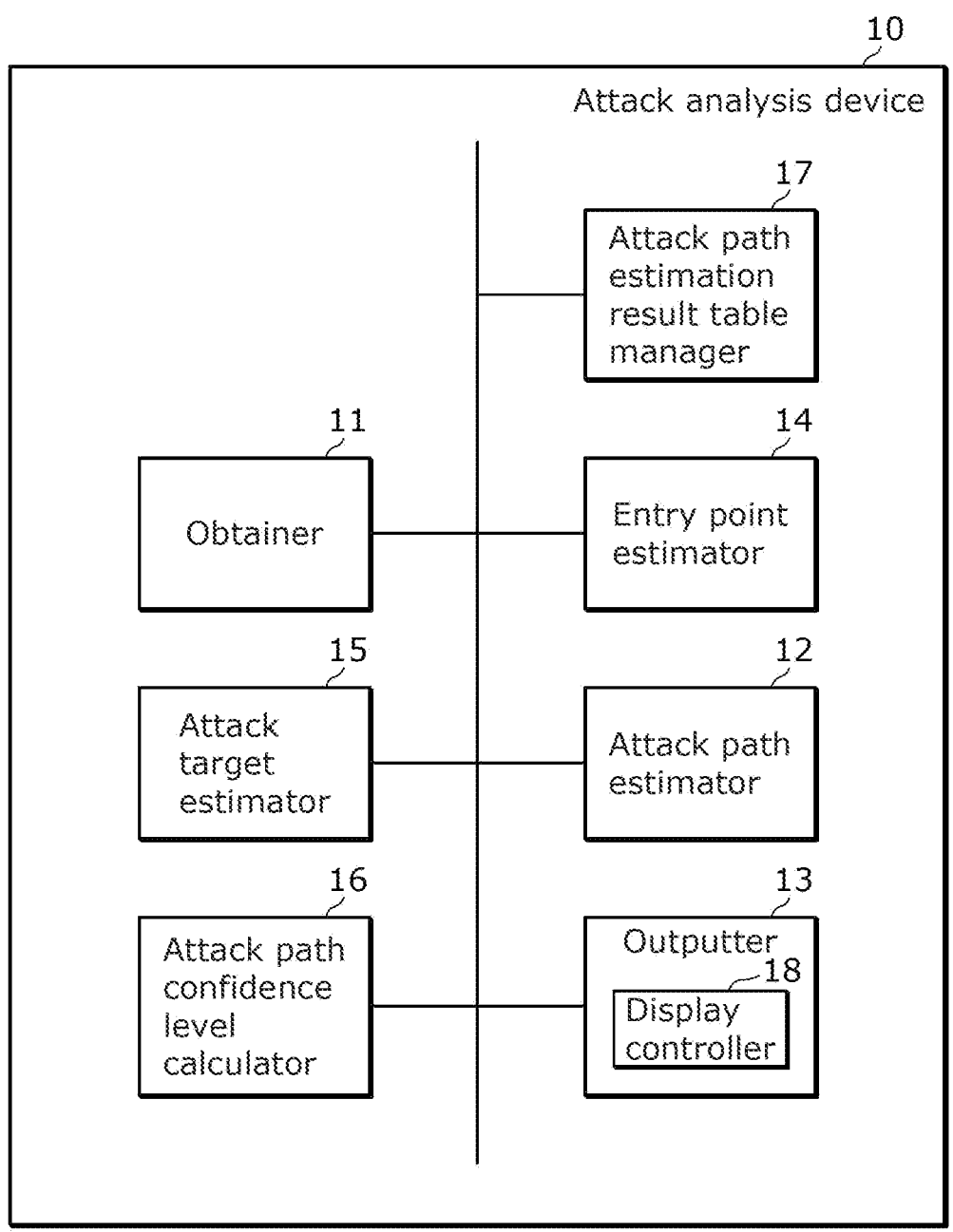
FIG. 9 is a block diagram illustrating an example of the configuration of an attack analysis device according to an embodiment.

FIG. 9 is a block diagram illustrating an example of the configuration of attack analysis device 10.

As illustrated in FIG. 9, attack analysis device 10 includes obtainer 11, entry point estimator 14, attack target estimator 15, attack path estimator 12, attack path estimation result table manager 17, attack path confidence level calculator 16, and outputter 13.

Obtainer 11 obtains the in-vehicle network information, the anomaly detection information, the external communication event history, and the vehicle control event history transmitted from security master 27.

Based on the in-vehicle network information, the anomaly detection information, and the external communication event history obtained by obtainer 11, entry point estimator 14 estimates an entry point indicating external communication IF 21 that is the point of intrusion into in-vehicle network 20 in the attack on in-vehicle network 20. At this time, for each of the plurality of external communication IFs 21, entry point estimator 14 calculates an entry point risk, which indicates a confidence level of that external communication IF 21 being an entry point, and estimates the entry point based on each of the calculated entry point risks.

The estimation of the entry point by entry point estimator 14 will be described in detail later with reference to flowcharts and the like.

Based on the in-vehicle network information, the anomaly detection information, and the vehicle control event history obtained by obtainer 11, attack target estimator 15 estimates an attack target indicating ECU 22 which is the target of the attack on in-vehicle network 20. At this time, for each of the plurality of ECUs 22, attack target estimator 15 calculates an attack target risk, which indicates a confidence level that that ECU 22 is the attack target, and estimates the attack target based on each of the calculated attack target risks.

The estimation of the attack target by attack target estimator will be described in detail later with reference to flowcharts and the like.

Based on the in-vehicle network information and the anomaly detection information obtained by obtainer 11, attack path estimator 12 estimates an attack path, including the entry point and the attack target, in the attack on in-vehicle network 20. The descriptions in the embodiment assume that attack path estimator 12 estimates the attack path based on the entry point estimated by entry point estimator 14, the attack target estimated by attack target estimator 15, the in-vehicle network information obtained by obtainer 11, and the anomaly detection information obtained by obtainer 11.

The estimation of the attack path by attack path estimator 12 will be described in detail later with reference to flowcharts and the like.

Based on the entry point risk of the entry point calculated by entry point estimator 14 and the attack target risk of the attack target calculated by attack target estimator 15, attack path confidence level calculator 16 calculates an attack path confidence level indicating a confidence level for the attack path estimated by attack path estimator 12.

The calculation of the attack path confidence level by attack path confidence level calculator 16 will be described in detail later with reference to flowcharts and the like.

Upon obtainer 11 obtaining the anomaly detection information, attack path estimation result table manager 17 generates the attack path estimation result table based on the anomaly detection information obtained by obtainer 11. Then, attack path estimation result table manager 17 successively updates and manages the generated attack path estimation result table based on the various types of signals output from entry point estimator 14, attack target estimator 15, attack path estimator 12, or attack path confidence level calculator 16.

FIG. 10 is a schematic diagram illustrating an example of the attack path estimation result table generated by attack path estimation result table manager 17. Here, FIG. 10 is a schematic diagram of the attack path estimation result table which is the attack path estimation result table in an initial state, generated by attack path estimation result table manager 17, as a result of obtainer 11 obtaining the anomaly detection information, and which has not yet been updated.

As illustrated in FIG. 10, the attack path estimation result table is a table which, for each node included in in-vehicle network 20, associates the following: the classification of the node; a timestamp indicating the date and time when an anomaly has been detected by the IDS which detects anomalies for that node; whether or not an anomaly has been detected by the IDS which detects anomalies for that node; the anomaly detection score output from the IDS which detects anomalies for that node; an estimation result indicating an anomaly state of that node, estimated by entry point estimator 14 when that node is external communication IF 21, or an estimation result indicating an anomaly state of that node, estimated by attack target estimator 15 when that node is ECU 22; a risk indicating the entry point risk of that node, calculated by entry point estimator 14 when that node is communication IF 21, or the attack target risk of that node, calculated by attack target estimator 15 when that node is ECU 22; an attack path indicating whether that node corresponds to the attack path estimated by attack path estimator 12; and the attack path confidence level of that attack path, calculated by attack path confidence level calculator 16. The method for estimating the estimation result and risk value estimated by attack target estimator 15 or entry point estimator 14, and the attack path estimated by attack path estimator 12, will be described later.

As illustrated in FIG. 10, the attack path estimation result table in the initial state has no information recorded for the estimation results, risks, attack paths, and attack path confidence levels.

The attack path estimation result table updated successively by attack path estimation result table manager 17 will be described later.

Returning to FIG. 9, descriptions of attack analysis device 10 will be resumed.

Attack path estimation result table manager 17 generates and manages an attack path history, which indicates a history of the attack paths estimated by attack path estimator 12.

FIG. 11 is a schematic diagram illustrating an example of the attack path history managed by attack path estimation result table manager 17.

As illustrated in FIG. 11, the attack path history is a table which, for each attack path estimated by attack path estimator 12, associates an anomaly notification ID identifying the anomaly detection corresponding to that attack path, the attack path confidence level calculated by attack path confidence level calculator 16 for that attack path, the entry point of that attack path, the entry point risk calculated by entry point estimator 14 for that entry point, the attack target of that attack path, and the attack target risk calculated by attack target estimator 15 for that attack target.

Returning to FIG. 9, descriptions of attack analysis device 10 will be resumed.

Outputter 13 outputs the attack path estimated by attack path estimator 12. This embodiment will describe outputter 13 as including display controller 18, which outputs a display control signal including the attack path to display device 41.

When attack path estimator 12 has estimated the attack path, display controller 18 outputs a display control signal including the attack path to display device 41, the display control signal controlling display device 41 to display a configuration diagram indicating the configuration of the in-vehicle network, and display the attack path using a different method from the other parts in that configuration diagram. At this time, display controller 18 may output the display control signal as a display control signal which controls display device 41 to display, in table format, information pertaining to the estimation result from attack path estimator 12, the estimation result from entry point estimator 14, the estimation result from attack target estimator 15, and/or the calculation result from attack path confidence level calculator 16, for example. The descriptions here will assume that display controller 18 further implements the display control signal as a display control signal that controls display device 41 to display, in table format, the attack path history managed by attack path estimation result table manager 17.

A specific example of a screen displayed by display device 41 under the control of the display control signal output by display controller 18 will be described later.

Operations

Operations performed by attack monitoring system 1 having the aforementioned configuration will be described hereinafter with reference to the drawings.

Figure 13:
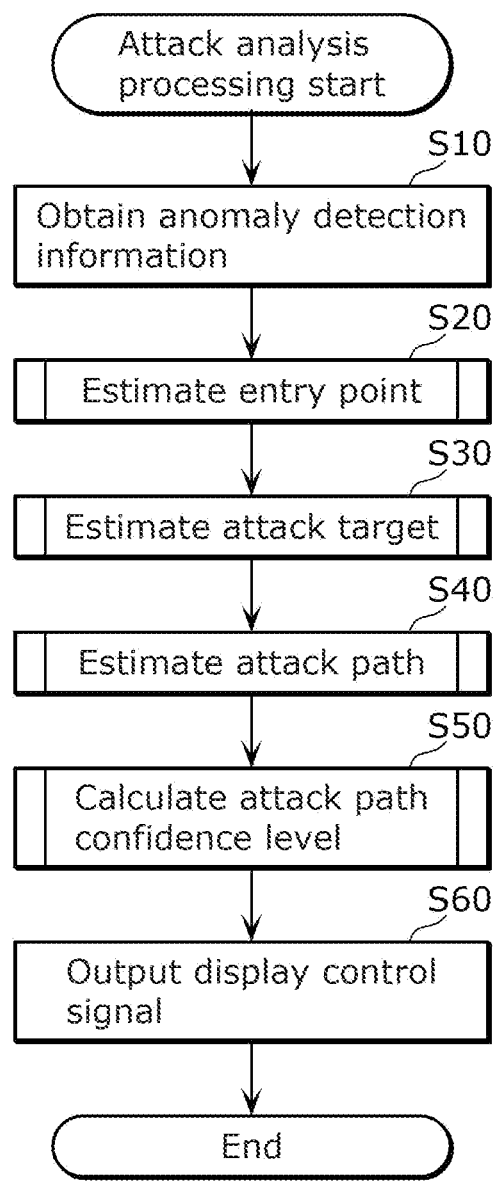
FIG. 13 is a flowchart illustrating attack analysis processing according to an embodiment.

FIG. 12 is a sequence chart illustrating attack monitoring processing performed by attack monitoring system 1. FIG. 13 is a flowchart illustrating attack analysis processing performed by attack analysis device 10 in the attack monitoring processing performed by attack monitoring system 1.

As illustrated in FIG. 12, in the attack monitoring processing, when IDS 23 included in in-vehicle network 20 detects an anomaly, that IDS 23 notifies security master 27 that an anomaly has been detected.

Upon being notified of the anomaly detection by IDS 23, security master 27 generates the anomaly detection information (here, the anomaly detection list), and makes a request to vehicle control event manager 28 for the vehicle control event history and the external communication event history within predetermined period T2 before and after the detection of the anomaly by IDS 23.

Upon doing so, vehicle control event manager 28 transmits the requested vehicle control event history and external communication event history to security master 27.

Security master 27 obtains the vehicle control event history and the external communication event history. Security master 27 then transmits the generated anomaly detection information to attack analysis device 10 along with the in-vehicle network information, the obtained vehicle control event history, and the obtained external communication event history.

When the anomaly detection information is transmitted from security master 27, attack analysis device 10 starts attack analysis processing.

As illustrated in FIGS. 12 and 13, in the attack analysis processing, obtainer 11 obtains the anomaly detection information, the in-vehicle network information, the vehicle control event history, and the external communication event history transmitted from security master 27 (step S10).

Next, based on the in-vehicle network information, the anomaly detection information, and the external communication event history obtained by obtainer 11, entry point estimator 14 estimates the entry point (step S20). At this time, entry point estimator 14 calculates the entry point risk for each of the plurality of external communication IFs 21 in the process of estimating the entry point. This entry point estimation is implemented by entry point estimator 14 performing entry point estimation processing, which will be described later.

Next, based on the in-vehicle network information, the anomaly detection information, and the vehicle control event history obtained by obtainer 11, attack target estimator 15 estimates the attack target (step S30). At this time, attack target estimator 15 calculates the attack target risk for each of the plurality of ECUs 22 in the process of estimating the attack target. This attack target estimation is implemented by attack target estimator 15 performing attack target estimation processing, which will be described later.

Next, attack path estimator 12 estimates the attack path based on the entry point estimated by entry point estimator 14, the attack target estimated by attack target estimator 15, the in-vehicle network information obtained by obtainer 11, and the anomaly detection information obtained by obtainer 11 (step S40). This attack path estimation is implemented by attack path estimator 12 performing attack path estimation processing, which will be described later.

Next, based on the entry point risk of the entry point calculated by entry point estimator 14 and the attack target risk of the attack target calculated by attack target estimator 15, attack path confidence level calculator 16 calculates an attack path confidence level for the attack path estimated by attack path estimator 12 (step S50). This attack path confidence level calculation is implemented by attack path confidence level calculator 16 performing attack path confidence level calculation processing, which will be described later.

Next, outputter 13 outputs, to display device 41, a display control signal including the attack path estimated by attack path estimator 12 (step S60).

Once outputter 13 outputs the display control signal, attack analysis device 10 ends the attack analysis processing.

Once outputter 13 outputs the display control signal, display device 41 displays an image based on that display control signal.

Once display device 41 displays the image based on the display control signal, attack monitoring system 1 ends the attack monitoring processing.

Figure 14:
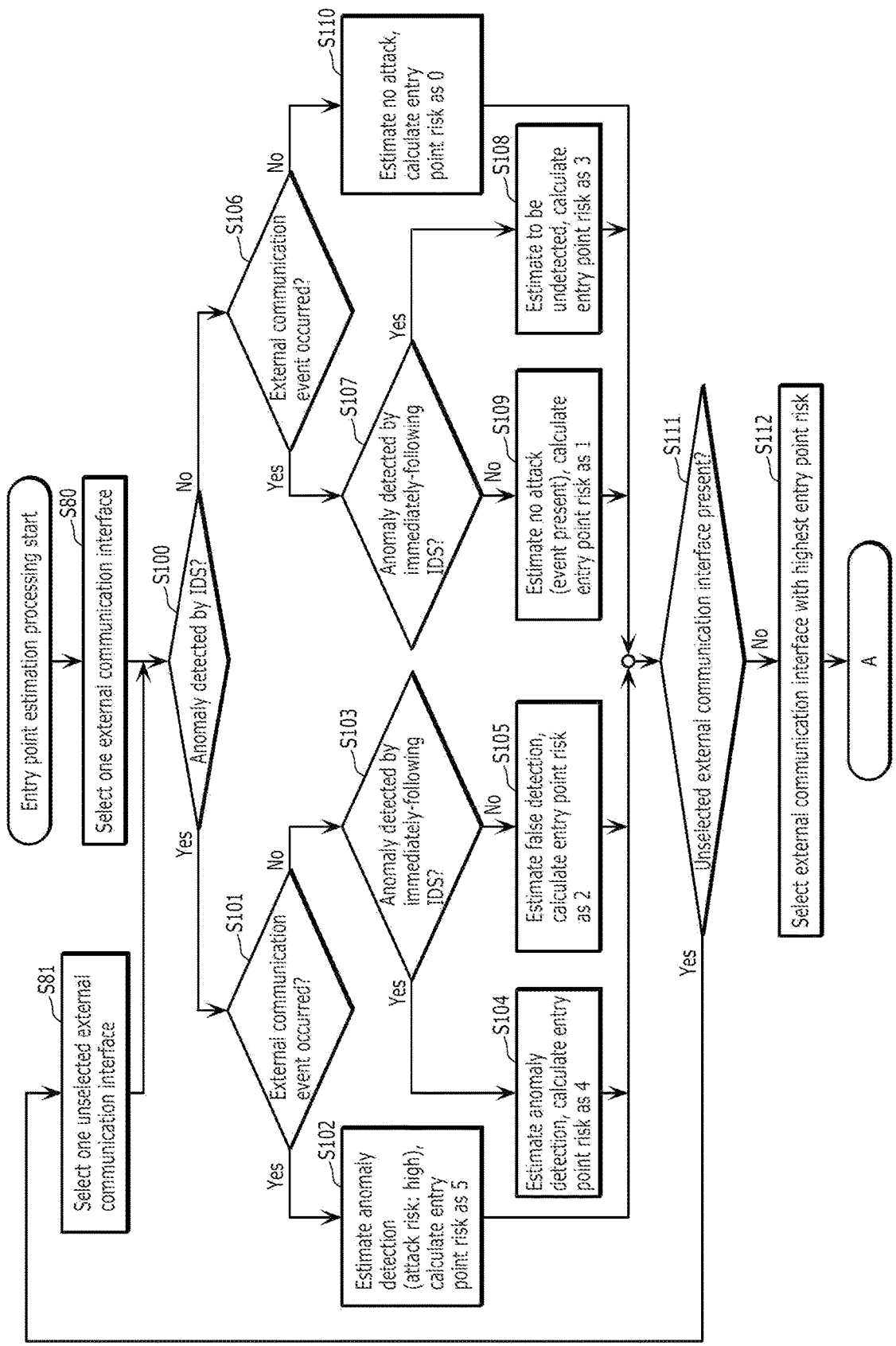
FIG. 14 is a flowchart illustrating entry point estimation processing according to an embodiment.
Figure 15:
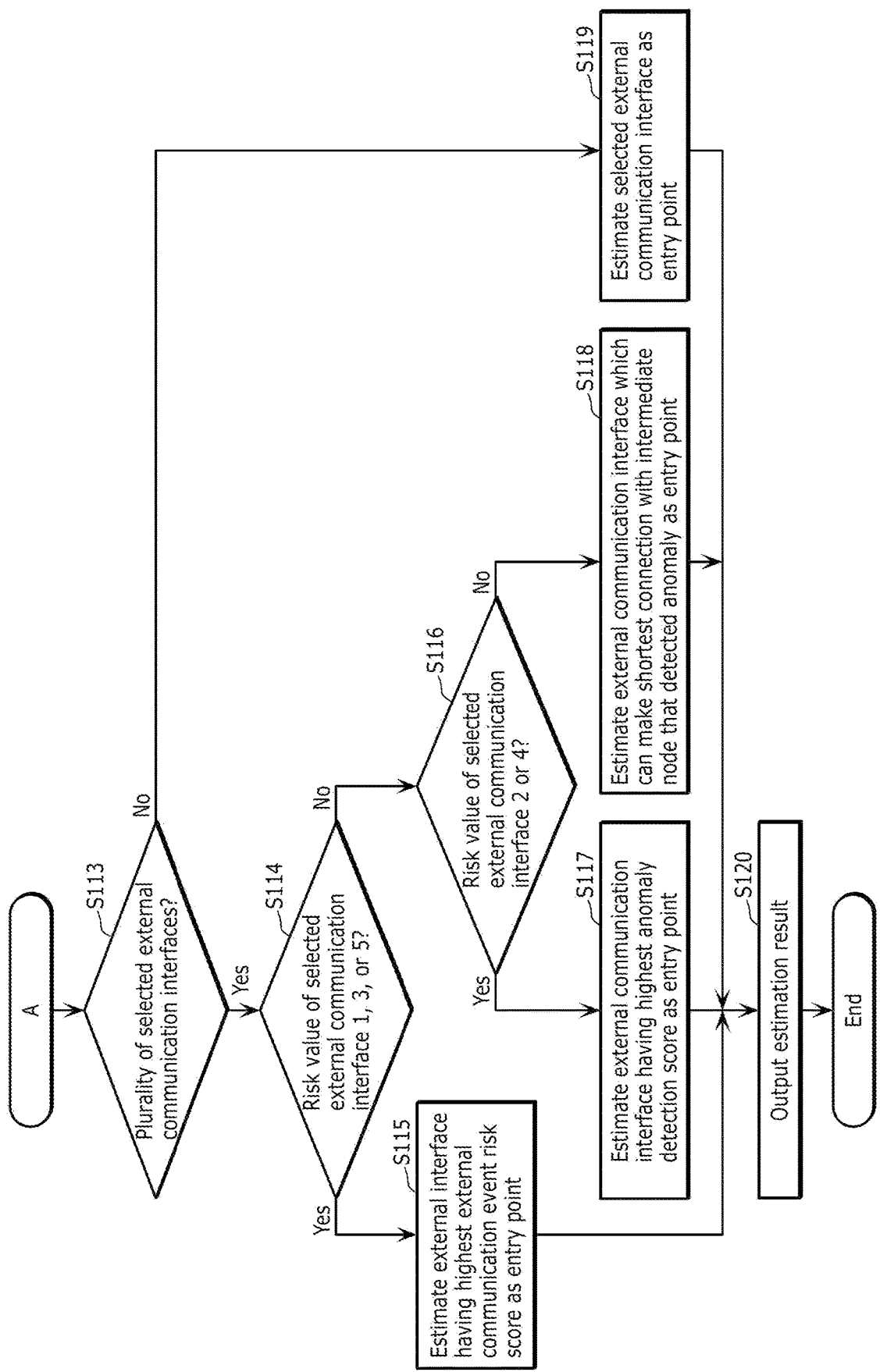
FIG. 15 is a flowchart illustrating entry point estimation processing according to an embodiment.

FIGS. 14 and 15 are flowcharts illustrating the entry point estimation processing performed by entry point estimator 14.

As illustrated in FIGS. 14 and 15, when the entry point estimation processing is started, entry point estimator 14 obtains the in-vehicle network information, the anomaly detection information, and the external communication event history obtained by obtainer 11, and referring to the in-vehicle network information, selects one external communication IF 21 among the plurality of external communication IFs 21 included in in-vehicle network 20 (step S80).

Then, referring to anomaly detection information, entry point estimator 14 checks whether IDS 23 included in the selected external communication IF 21 has detected an anomaly (step S100).

If IDS 23 included in the selected external communication IF 21 has detected an anomaly in the processing of step S100 (step S100: Yes), entry point estimator 14 refers to the external communication event history, and checks whether the selected external communication IF 21 has produced an external communication event by communicating with the exterior (step S101).

If the selected external communication IF 21 has produced an external communication event by communicating with the exterior in the processing of step S101 (step S101: Yes), entry point estimator 14 estimates the anomaly state of the selected external communication IF 21 to be "anomaly detected (attack risk: high)", and calculates the entry point risk for that external communication IF 21 as "5" (step S102).

If the selected external communication IF 21 has not produced an external communication event by communicating with the exterior in the processing of step S101 (step S101: No), entry point estimator 14 refers to the anomaly detection information and the external communication event history, and checks whether IDS 23 immediately following the selected external communication IF 21 has detected an anomaly (step S103).

If IDS 23 immediately following the selected external communication IF 21 has detected an anomaly in the processing of step S103 (step S103: Yes), entry point estimator 14 estimates the anomaly state of the selected external communication IF 21 to be "anomaly detected", and calculates the entry point risk for that external communication IF 21 as "4" (step S104).

If IDS 23 immediately following the selected external communication IF 21 has not detected an anomaly in the processing of step S103 (step S103: No), entry point estimator 14 estimates the anomaly state of the selected external communication IF 21 to be "false detection", and calculates the entry point risk for that external communication IF 21 as "2" (step S105).

If IDS 23 included in the selected external communication IF 21 has not detected an anomaly in the processing of step S100 (step S100: No), entry point estimator 14 refers to the external communication event history, and checks whether the selected external communication IF 21 has produced an external communication event by communicating with the exterior (step S106).

If the selected external communication IF 21 has produced an external communication event by communicating with the exterior in the processing of step S106 (step S106: Yes), entry point estimator 14 refers to the anomaly notification information and the external communication event history, and checks whether IDS 23 immediately following the selected external communication IF 21 has detected an anomaly (step S107).

If IDS 23 immediately following the selected external communication IF 21 has detected an anomaly in the processing of step S107 (step S107: Yes), entry point estimator 14 estimates the anomaly state of the selected external communication IF 21 to be "undetected", and calculates the entry point risk for that external communication IF 21 as "3" (step S108).

If IDS 23 immediately following the selected external communication IF 21 has not detected an anomaly in the processing of step S107 (step S107: No), entry point estimator 14 estimates the anomaly state of the selected external communication IF 21 to be "no attack (event present)", and calculates the entry point risk for that external communication IF 21 as "1" (step S109).

If the selected external communication IF 21 has not produced an external communication event by communicating with the exterior in the processing of step S106 (step S106: No), entry point estimator 14 estimates the anomaly state of the selected external communication IF 21 to be "no attack", and calculates the entry point risk for that external communication IF 21 as "0" (step S110).

When the processing of step S102, the processing of step S104, the processing of step S105, the processing of step S108, the processing of step S109, or the processing of step S110 ends, entry point estimator 14 refers to the in-vehicle network information and checks whether there are unselected external communication IFs 21, among the plurality of external communication IFs 21 included in in-vehicle network 20, which have not yet been selected in the entry point estimation processing (step S111).

If there are unselected external communication IFs 21 in the processing of step S111 (step S111: Yes), entry point estimator 14 selects one external communication IF 21 among the unselected external communication IFs 21 (step S81), and moves to the processing of step S100.

If there are no unselected external communication IFs 21 in the processing of step S111 (step S111: No), entry point estimator 14 selects external communication IF 21 having the highest calculated entry point risk (step S112).

If there are a plurality of external communication IFs 21 selected in the processing of step S112 (step S113: Yes), entry point estimator 14 checks whether the entry point risks of those external communication IFs 21 are 1, 3, or 5 (step S114).

If the entry point risks are 1, 3, or 5 in the processing of step S114 (step S114: Yes), entry point estimator 14 refers to the external communication event history and estimates external communication IF 21, among those external communication IFs 21, which has the highest score for the associated external communication event risk, i.e., the highest degree of risk of a cyber attack due to the associated external communication event, as the entry point (step S115).

If the entry point risks are not 1, 3, or 5 in the processing of step S114 (step S114: No), entry point estimator 14 checks whether the entry point risks of those external communication IFs 21 are 2 or 4 (step S116).

If the entry point risks are 2 or 4 in the processing of step S116 (step S116: Yes), entry point estimator 14 refers to the anomaly detection information and estimates external communication IF 21, among those external communication IFs 21, which has the highest associated anomaly detection score, as the entry point (step S117).

If the entry point risks are not 2 or 4 in the processing of step S116 (step S116: No), entry point estimator 14 refers to the anomaly detection information and the in-vehicle network information, and estimates external communication IF 21 which can make the shortest connection to an intermediate node which detected the anomaly as the entry point (step S118).

If there are not a plurality of external communication IFs 21 selected in the processing of step S112 (step S113: No), i.e., if there is only one selected external communication IF 21, entry point estimator 14 estimates that external communication IF 21 as the entry point (step S119).

When the processing of step S115, the processing of step S117, the processing of step S118, or the processing of step S119 ends, entry point estimator 14 outputs the estimated entry point as an estimation result of that entry point estimation processing (step S120).

When the processing of step S120 ends, entry point estimator 14 ends that entry point estimation processing.

Figure 16:
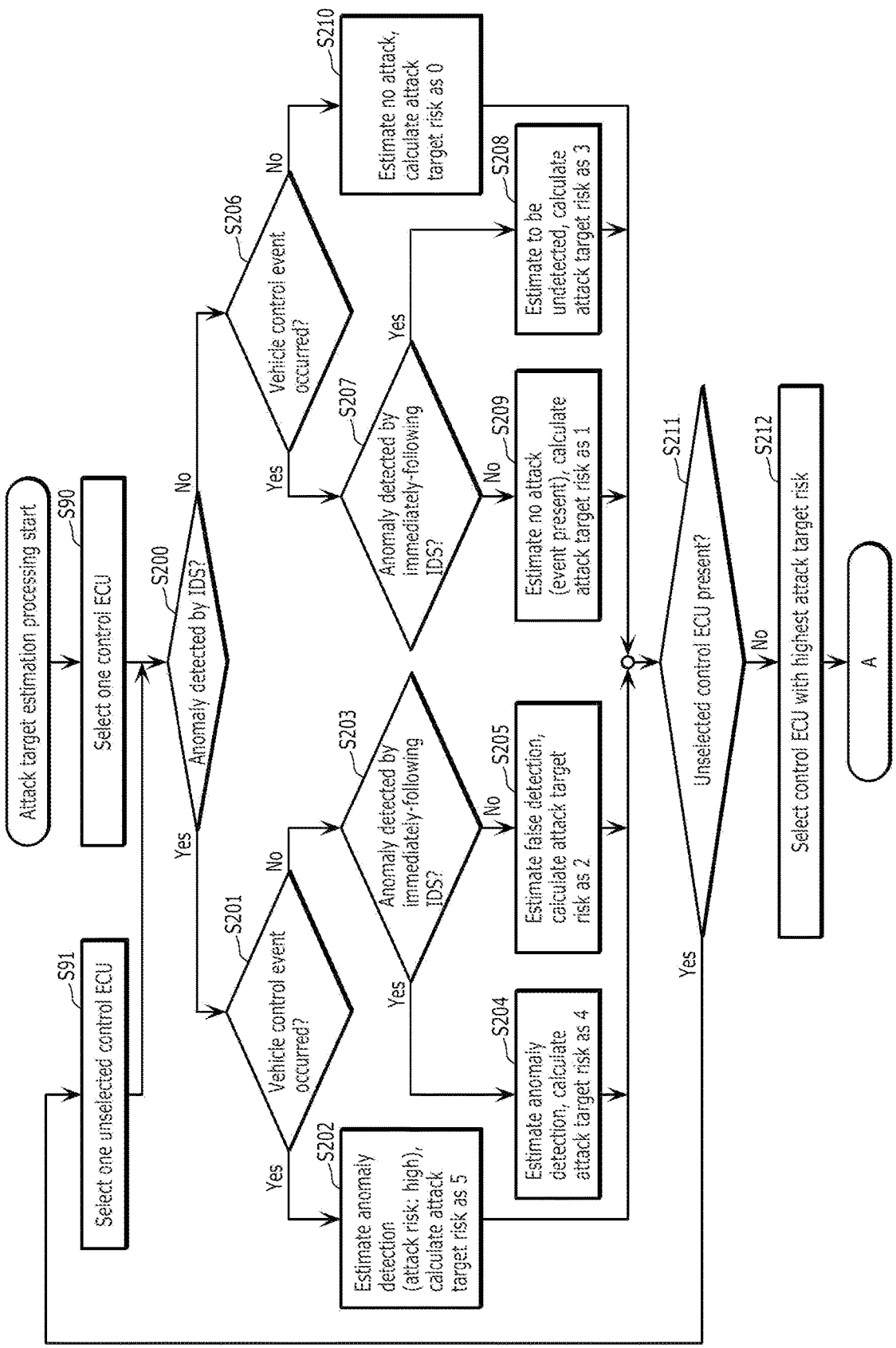
FIG. 16 is a flowchart illustrating attack target estimation processing according to an embodiment.
Figure 17:
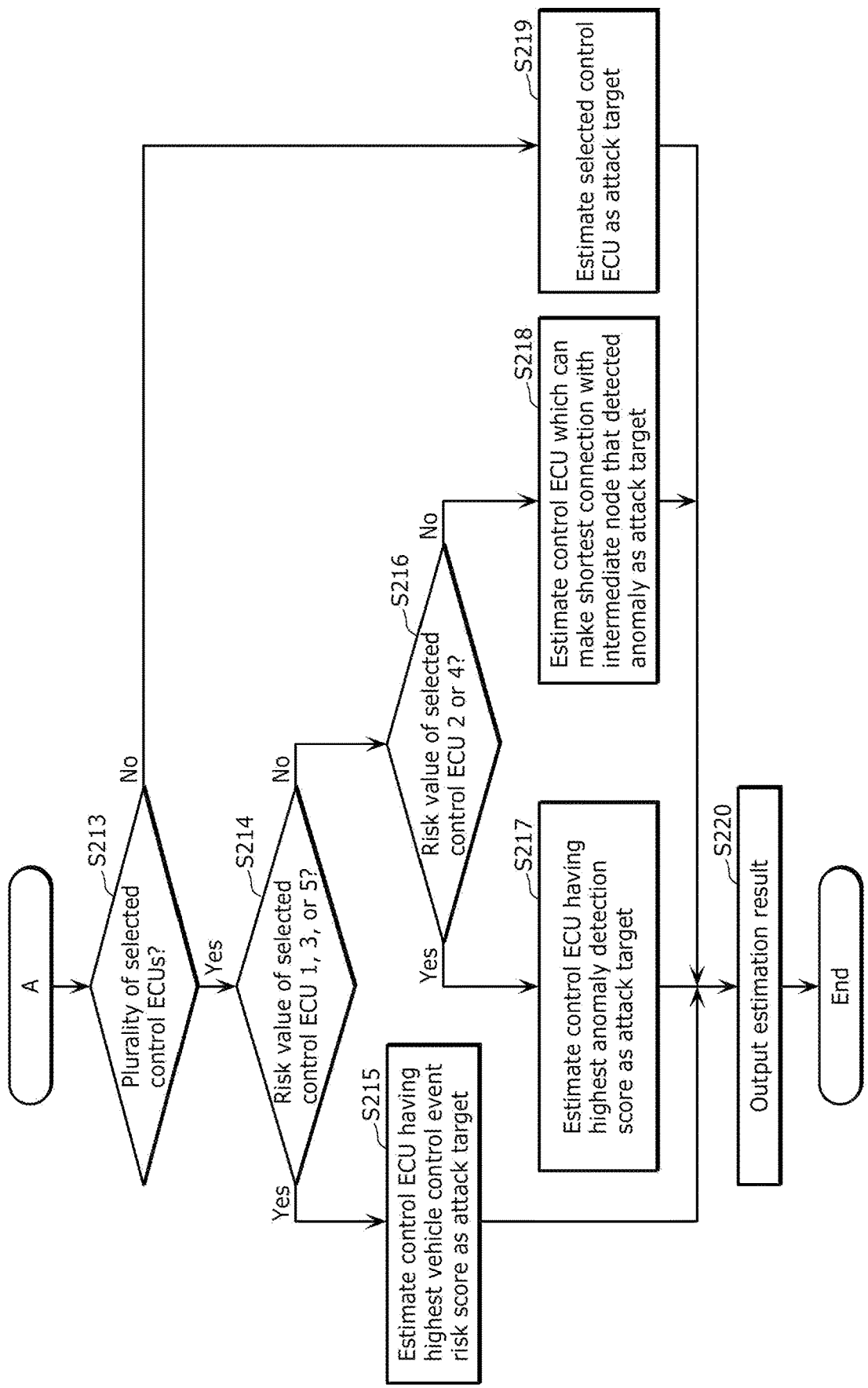
FIG. 17 is a flowchart illustrating attack target estimation processing according to an embodiment.

FIGS. 16 and 17 are flowcharts illustrating the attack target estimation processing performed by attack target estimator 15.

As illustrated in FIGS. 16 and 17, when the attack target estimation processing is started, attack target estimator 15 obtains the in-vehicle network information, the anomaly detection information, and the vehicle control event history obtained by obtainer 11, and referring to the in-vehicle network information, selects one ECU 22 among the plurality of ECUs 22 included in in-vehicle network 20 (step S90).

Then, referring to the anomaly detection information, attack target estimator 15 checks whether IDS 23 included in the selected ECU 22 has detected an anomaly (step S200).

If IDS 23 included in the selected ECU 22 has detected an anomaly in the processing of step S200 (step S200: Yes), attack target estimator 15 refers to the vehicle control event history and checks whether a vehicle control event has been produced by the selected ECU 22 (step S201).

If the selected ECU 22 has produced a vehicle control event in the processing of step S201 (step S201: Yes), attack target estimator 15 estimates the anomaly state of the selected ECU 22 to be "anomaly detected (attack risk: high)", and calculates the attack target risk for that ECU 22 as "5" (step S202).

If the selected ECU 22 has not produced a vehicle control event in the processing of step S201 (step S201: No), attack target estimator 15 refers to the anomaly detection information and the vehicle control event history, and checks whether IDS 23 immediately before the selected ECU 22 has detected an anomaly (step S203).

If IDS 23 immediately before the selected ECU 22 has detected an anomaly in the processing of step S203 (step S203: Yes), attack target estimator 15 estimates the anomaly state of the selected ECU 22 to be "anomaly detected", and calculates the attack target risk for that ECU 22 as "4" (step S204).

If IDS 23 immediately before the selected ECU 22 has not detected an anomaly in the processing of step S203 (step S203: No), attack target estimator 15 estimates the anomaly state of the selected ECU 22 to be "false detection", and calculates the attack target risk for that ECU 22 as "2" (step S205).

If IDS 23 included in the selected ECU 22 has not detected an anomaly in the processing of step S200 (step S200: No), attack target estimator 15 refers to the vehicle control event history and checks whether a vehicle control event has been produced by the selected ECU 22 (step S206).

If the selected ECU 22 has produced a vehicle control event in the processing of step S206 (step S206: Yes), attack target estimator 15 refers to the anomaly notification information and the vehicle control event history, and checks whether IDS 23 immediately before the selected ECU 22 has detected an anomaly (step S207).

If IDS 23 immediately before the selected ECU 22 has detected an anomaly in the processing of step S207 (step S207: Yes), attack target estimator 15 estimates the anomaly state of the selected ECU 22 to be "undetected", and calculates the attack target risk for that ECU 22 as "3" (step S208).

If IDS 23 immediately before the selected ECU 22 has not detected an anomaly in the processing of step S207 (step S207: No), attack target estimator 15 estimates the anomaly state of the selected ECU 22 to be "no attack (event present)", and calculates the attack target risk for that ECU 22 as "1" (step S209).

If the selected ECU 22 has not produced a vehicle control event in the processing of step S206 (step S206: No), attack target estimator 15 estimates the anomaly state of the selected ECU 22 to be "no attack", and calculates the attack target risk for that ECU 22 as "0" (step S210).

When the processing of step S202, the processing of step S204, the processing of step S205, the processing of step S208, the processing of step S209, or the processing of step S210 ends, attack target estimator 15 refers to the in-vehicle network information and checks whether there are unselected ECUs 22, among the plurality of ECUs 22 included in in-vehicle network 20, which have not yet been selected in the attack target estimation processing (step S211).

If there are unselected ECUs 22 in the processing of step S211 (step S211: Yes), attack target estimator 15 selects one ECU 22 among the unselected ECUs 22 (step S91), and moves to the processing of step S200.

If there are no unselected ECUs 22 in the processing of step S211 (step S211: No), attack target estimator 15 selects ECU 22 having the highest calculated attack target risk (step S212).

If there are a plurality of ECUs 22 selected in the processing of step S212 (step S213: Yes), attack target estimator 15 checks whether the attack target risks of those ECUs 22 are 1, 3, or 5 (step S214).

If the attack target risks are 1, 3, or 5 in the processing of step S214 (step S214: Yes), attack target estimator 15 refers to the vehicle control event history and estimates ECU 22, among those ECUs 22, which has the highest score for the associated vehicle control event risk, i.e., the highest severity of the associated vehicle control event threatening the safety of vehicle 30, as the attack target (step S215).

If the attack target risks are not 1, 3, or 5 in the processing of step S214 (step S214: No), attack target estimator 15 checks whether the attack target risks of those ECUs 22 are 2 or 4 (step S216).

If the attack target risks are 2 or 4 in the processing of step S216 (step S216: Yes), attack target estimator 15 refers to the anomaly detection information and estimates ECU 22, among those ECUs 22, which has the highest associated anomaly detection score, as the attack target (step S217).

If the attack target risks are not 2 or 4 in the processing of step S216 (step S216: No), attack target estimator 15 refers to the anomaly detection information and the in-vehicle network information, and estimates ECU 22 which can make the shortest connection to an intermediate node which detected the anomaly as the attack target (step S218).

If there are not a plurality of ECUs 22 selected in the processing of step S212 (step S213: No), i.e., if there is only one selected ECU 22, attack target estimator 15 estimates that ECU 22 as the attack target (step S219).

When the processing of step S215, the processing of step S217, the processing of step S218, or the processing of step S219 ends, attack target estimator 15 outputs the estimated attack target as an estimation result of that attack target estimation processing (step S220).

When the processing of step S220 ends, attack target estimator 15 ends that attack target estimation processing.

FIG. 18 is a schematic diagram illustrating an example of the attack path estimation result table updated by attack path estimation result table manager 17 after the entry point estimation processing has been executed by entry point estimator 14 and the attack target estimation processing has been executed by attack target estimator 15.

As illustrated in FIG. 18, when the entry point estimation processing is executed by entry point estimator 14 and the attack target estimation processing is executed by attack target estimator 15, attack path estimation result table manager 17 updates the attack path estimation result table by recording the anomaly state of each external communication IF 21 estimated by entry point estimator 14, or the anomaly state of each ECU 22 estimated by attack target estimator 15, as the estimation result, as well as the entry point risk of each external communication IF 21 calculated by entry point estimator 14, or the attack target risk of each ECU 22 calculated by attack target estimator 15, as the risk, in the attack path estimation result table.

Figure 19:
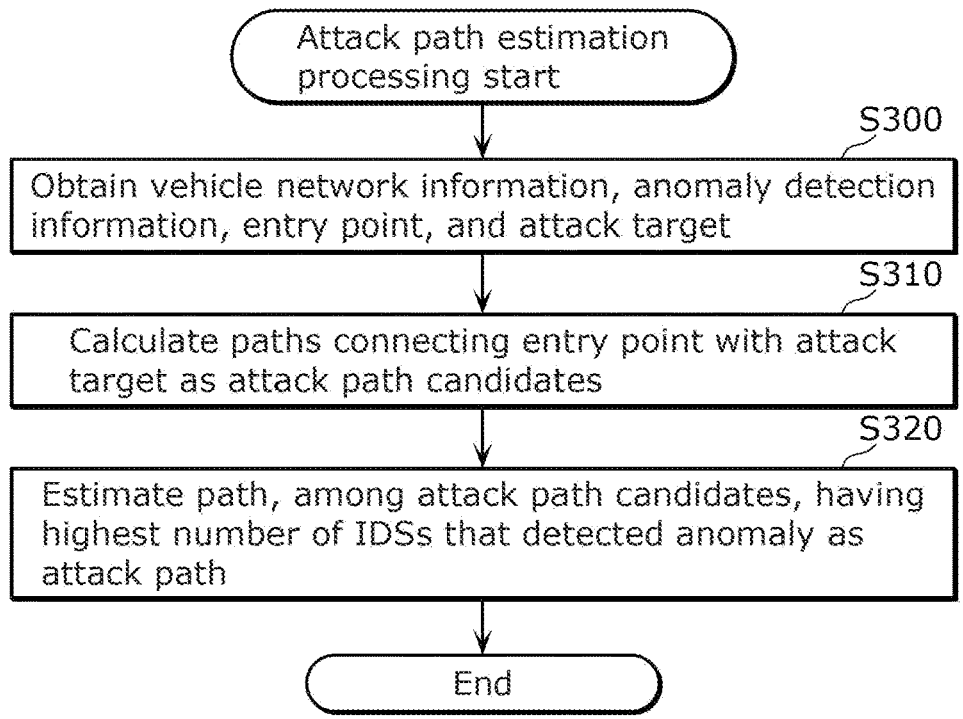
FIG. 19 is a flowchart illustrating attack path estimation processing according to an embodiment.

FIG. 19 is a flowchart illustrating the attack path estimation processing performed by attack path estimator 12.

As illustrated in FIG. 19, when the attack path estimation processing is started, attack path estimator 12 obtains the in-vehicle network information and the anomaly detection information obtained by obtainer 11, the entry point estimated by entry point estimator 14, and the attack target estimated by attack target estimator 15 (step S300).

Then, referring to the configuration of in-vehicle network 20 indicated by the in-vehicle network information, attack path estimator 12 calculates each of at least one path connecting the entry point with the attack target as an attack path candidate (step S310).

Once at least one attack path candidate is calculated, attack path estimator 12 refers to the anomaly detection information, and estimates the attack path candidate, among the at least one attack path candidate, which has the highest number of IDSs 23 that detected an anomaly, as the attack path (step S320). Here, if there are a plurality of attack path candidates having the highest number of IDSs 23 that detected an anomaly, attack path estimator 12 estimates each of the plurality of attack path candidates as an attack path.

When the processing of step S320 ends, attack path estimator 12 ends that attack path estimation processing.

Figure 20:
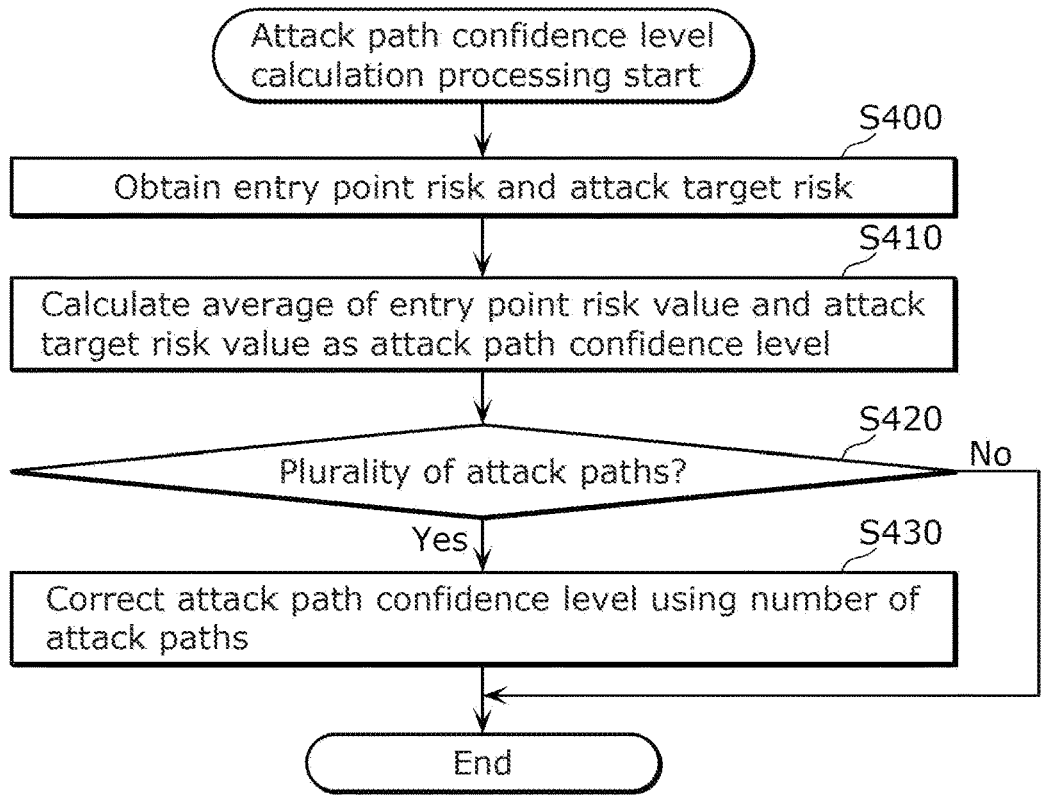
FIG. 20 is a flowchart illustrating attack path confidence level calculation processing according to an embodiment.

FIG. 20 is a flowchart illustrating the attack path confidence level calculation processing performed by attack path confidence level calculator 16.

As illustrated in FIG. 20, when the attack path confidence level calculation processing is started, attack path confidence level calculator 16 obtains the entry point risk of the entry point calculated by entry point estimator 14 and the attack target risk of the attack target calculated by attack target estimator 15 (step S400).

Then, attack path confidence level calculator 16 calculates an average of the obtained entry point risk of the entry point and attack target risk of the attack target as the attack path confidence level (step S410).

Once the attack path confidence level is calculated, attack path confidence level calculator 16 checks whether there are a plurality of attack paths estimated by attack path estimator 12 (step S420).

If there are a plurality of attack paths estimated by attack path estimator 12 in the processing of step S420 (step S420: Yes), attack path confidence level calculator 16 corrects the attack path confidence level using the number of attack paths (step S430). Attack path confidence level calculator 16 will be described here as correcting the attack path confidence level by dividing the attack path confidence level by the number of attack paths. However, as long as attack path confidence level calculator 16 can correct the attack path confidence level using the number of attack paths, it is not absolutely necessary to employ a configuration in which the attack path confidence level is corrected by dividing the attack path confidence level by the number of attack paths.

When the processing of step S430 ends, attack path confidence level calculator 16 ends that attack path confidence level calculation processing.

Attack path confidence level calculator 16 has been described as calculating an average of the obtained entry point risk of the entry point and attack target risk of the attack target as the attack path confidence level in the processing of step S410. However, attack path confidence level calculator 16 may calculate the attack path confidence level using another method. For example, attack path confidence level calculator 16 may refer to the configuration of in-vehicle network 20 indicated by the in-vehicle network information obtained by obtainer 11 and the anomaly detection information obtained by obtainer 11 and calculate, as the attack path confidence level, a numerical value between 0.0 and 1.0 obtained by dividing the number of IDSs 23 that detected an anomaly in the attack path by the total number of IDSs 23 in the attack path.

FIGS. 21 and 22 are schematic diagrams illustrating an example of the attack path estimation result table updated by attack path estimation result table manager 17 after the attack path estimation processing has been executed by attack path estimator 12 and the attack path confidence level calculation processing has been executed. Here, FIG. 21 is a schematic diagram illustrating an example of the attack path estimation result table when attack path estimator 12 has estimated a single attack path, and FIG. 22 is a schematic diagram illustrating an example of the attack path estimation result table when attack path estimator 12 has estimated a plurality of (two, here) attack paths.

As illustrated in FIGS. 21 and 22, when the attack path estimation processing is executed by attack path estimator 12 and the attack path confidence level calculation processing is executed, attack path estimation result table manager 17 updates the attack path estimation result table by recording a mark for the nodes corresponding to the attack path, for each attack path estimated by attack path estimator 12, and the attack path confidence level calculated by attack path confidence level calculator 16, in the attack path estimation result table.

Figure 23:
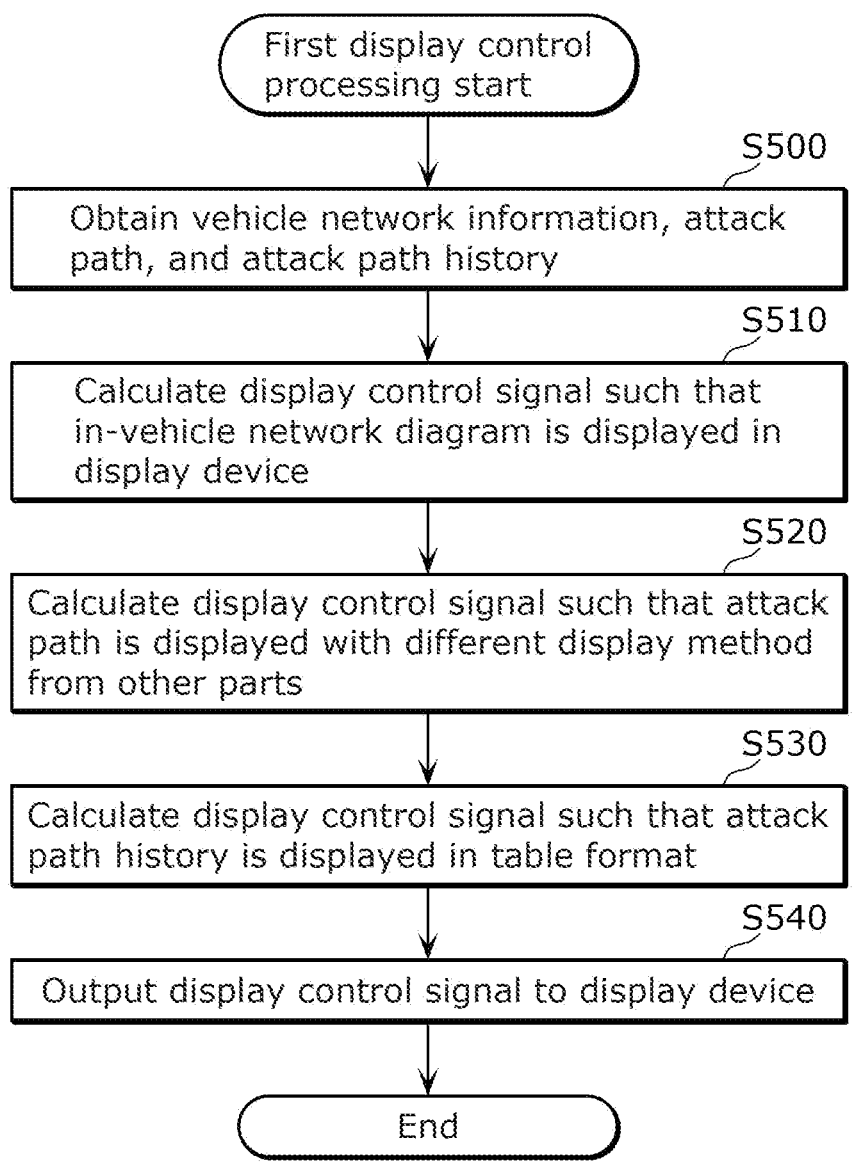
FIG. 23 is a flowchart illustrating first display control processing according to an embodiment.

FIG. 23 is a flowchart illustrating first display control processing performed by display controller 18.

As illustrated in FIG. 23, when the first display control processing is started, display controller 18 obtains the in-vehicle network information obtained by obtainer 11, the attack path estimated by attack path estimator 12, and the attack path history managed by attack path estimation result table manager 17 (step S500).

Then, referring to the configuration of in-vehicle network 20 indicated by the in-vehicle network information, display controller 18 calculates a display control signal such that an in-vehicle network configuration diagram indicating the configuration of the in-vehicle network is displayed in display device 41 (step S510).

Furthermore, referring to the attack path, display controller 18 calculates the display control signal such that the attack path is displayed in display device 41 using a different method from the other parts (step S520).

Furthermore, display controller 18 calculates the display control signal such that the attack path history is displayed in display device 41 in table format (step S530).

Then, display controller 18 outputs the calculated display control signal to display device 41 (step S540).

When the processing of step S540 ends, display controller 18 ends that first display control processing.

Figure 24:
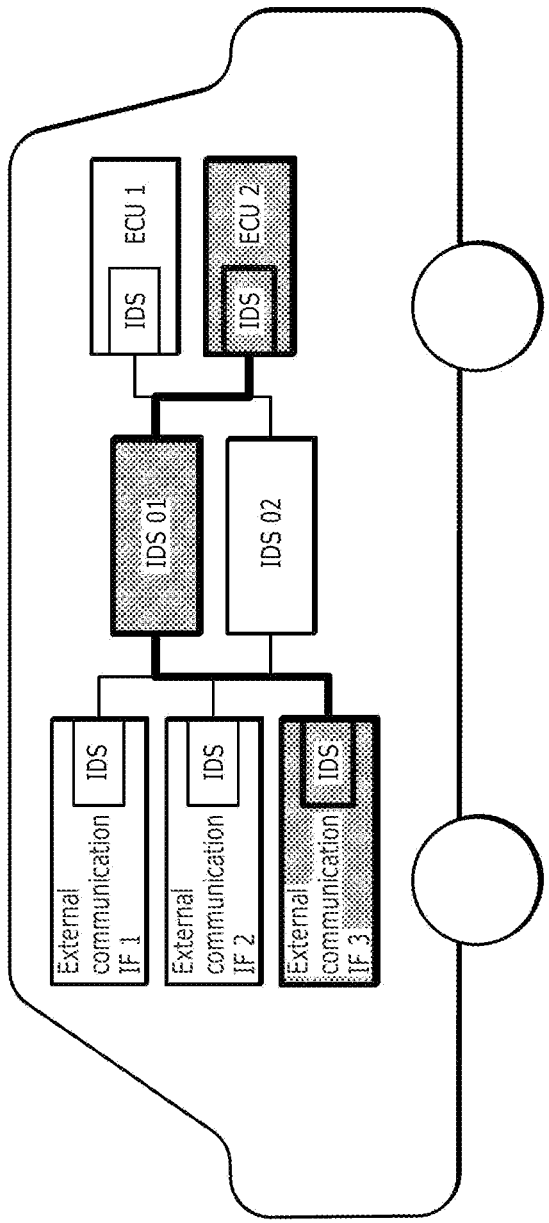
FIG. 24 is a schematic diagram illustrating an example of a screen displayed by a display device according to an embodiment.

FIG. 24 is a schematic diagram illustrating an example of a screen displayed by display device 41 under the control of the display control signal output as a result of display controller 18 executing the first display processing.

As illustrated in FIG. 24, by being controlled by the display control signal output from display controller 18, display device 41 displays (1) the in-vehicle network configuration diagram in which the attack path estimated by attack path estimator 12 is displayed using a display method different from other paths, and (2) a list of, for each of at least one attack path estimated by attack path estimator 12 in the past, the anomaly notification ID identifying an anomaly notification corresponding to that attack path, the attack path confidence level of that attack path, the entry point of that attack path, the entry point risk of that entry point, the attack target of that attack path, and the attack target risk of that attack target, which are associated with each other in table format.

Note that display controller 18 may perform second display control processing instead of the first display control processing.

Figure 25:
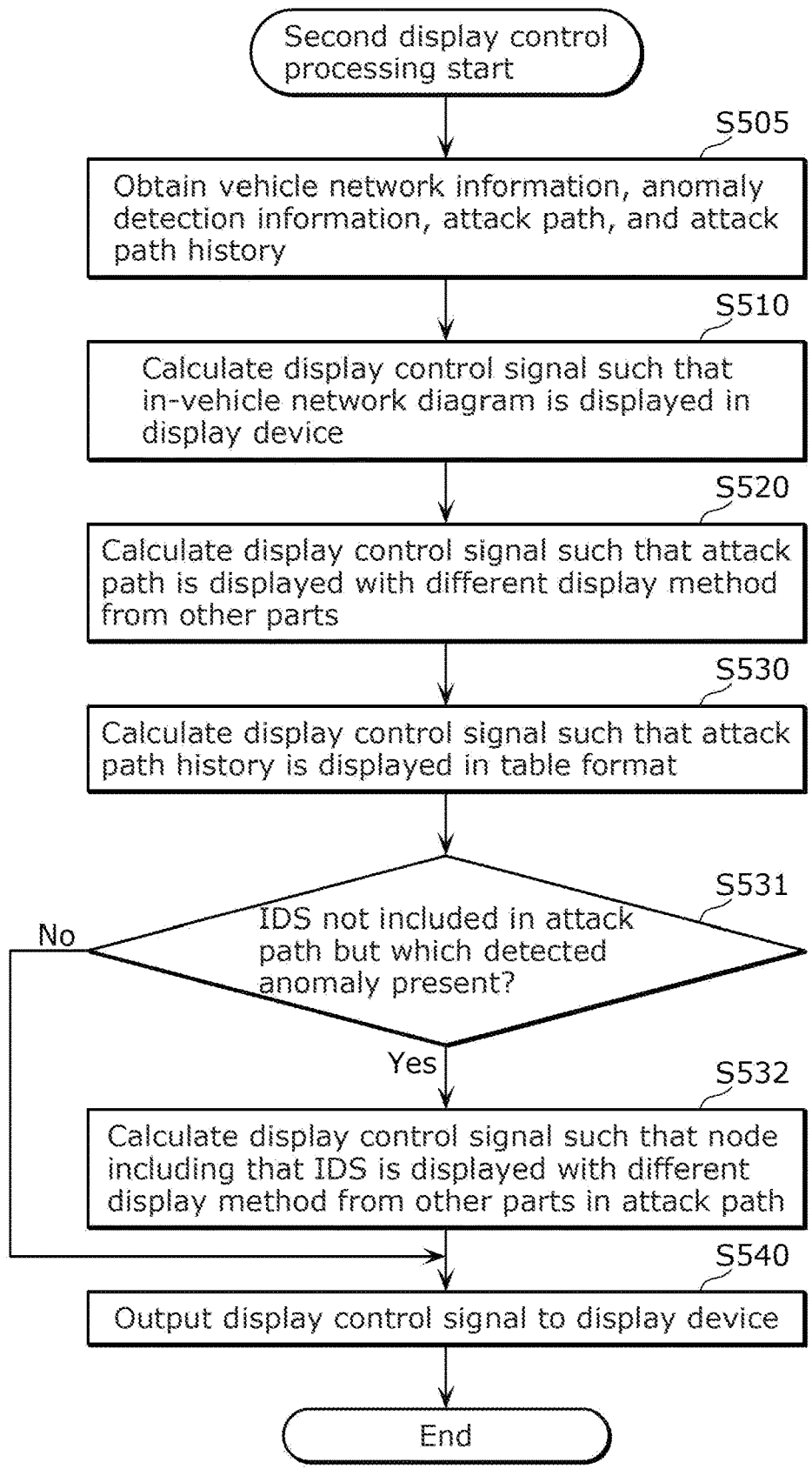
FIG. 25 is a flowchart illustrating second display control processing according to an embodiment.

FIG. 25 is a flowchart illustrating the second display control processing performed by display controller 18.

As illustrated in FIG. 25, the second display control processing is processing realized by changing the first display control processing such that the processing of step S505 is performed instead of the processing of step S500, and the processing of step S531 and the processing of step S532 are executed between the processing of step S530 and the processing of step S540.

Accordingly, the following descriptions will focus on the processing of step S505, the processing of step S531, and the processing of step S532.

As illustrated in FIG. 25, when the second display control processing is started, display controller 18 obtains the in-vehicle network information and the anomaly detection information obtained by obtainer 11, the attack path estimated by attack path estimator 12, and the attack path history managed by attack path estimation result table manager 17 (step S505), after which the processing moves to step S510.

When the processing of step S530 ends, display controller 18 refers to the anomaly detection information, and checks whether there is IDS 23 which is not included in the attack path but which has detected an anomaly (step S531).

If there is IDS 23 which is not included in the attack path but which has detected an anomaly in the processing of step S530 (step S531: Yes), display controller 18 calculates the display control signal such that the node including the corresponding IDS is displayed in display device 41 using a display method different from both the attack path and other parts (step S532).

If there is no IDS 23 which is not included in the attack path but which has detected an anomaly in the processing of step S530 (step S531: No), or if the processing of step S532 has ended, the processing moves to step S540.

When the processing of step S540 ends, display controller 18 ends that second display control processing.

Figure 26:
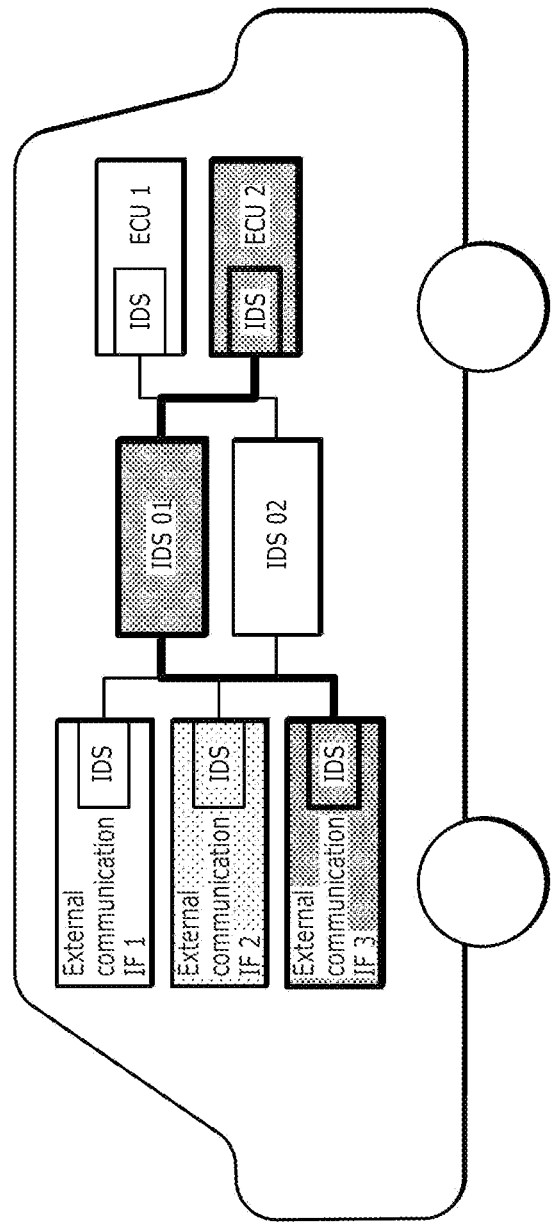
FIG. 26 is a schematic diagram illustrating an example of a screen displayed by a display device according to an embodiment.

FIG. 26 is a schematic diagram illustrating an example of a screen displayed by display device 41 under the control of the display control signal output as a result of display controller 18 executing the second display processing.

As illustrated in FIG. 26, by being controlled by the display control signal output from display controller 18, display device 41 displays (1) the in-vehicle network configuration diagram in which the attack path estimated by attack path estimator 12 is displayed using a display method different from other paths, and the node including IDS 23 which is not included in the attack path but which has detected an anomaly is displayed using a display method different from both the attack path and other parts, and (2) a list of, for each of at least one attack path estimated by attack path estimator 12 in the past, the anomaly notification ID identifying an anomaly notification corresponding to that attack path, the attack path confidence level of that attack path, the entry point of that attack path, the entry point risk of that entry point, the attack target of that attack path, and the attack target risk of that attack target, which are associated with each other in table format.

Effects

As described above, according to attack analysis device 10, when an attack is carried out on in-vehicle network 20, an attack path including the entry point and the attack target in that attack can be estimated. Accordingly, when an attack is carried out on in-vehicle network 20, the cost of analyzing the attack, including analyzing the attack, verifying the attack against other cases from the past, and the like, can be reduced for the user of attack analysis device 10.

Additionally, as described above, according to attack analysis device 10, an in-vehicle network configuration diagram in which the estimated attack path is displayed using a display method different from other paths can be displayed in display device 41. The user using attack analysis device 10 can therefore visually recognize the estimated attack path.

Supplemental Descriptions

An example of the technique disclosed in the present application has been described based on an embodiment. However, the present disclosure is not intended to be limited to this embodiment. Variations on the present embodiment conceived by one skilled in the art, embodiments implemented by combining constituent elements from different other embodiments, and the like may be included in the scope of one or more aspects of the present disclosure as well, as long as they do not depart from the essential spirit of the present disclosure.

(1) The embodiment described attack analysis device 10 as being realized by monitoring server 40 located outside in-vehicle network 20. However, it is not necessary for attack analysis device 10 to be limited to being realized by monitoring server 40, nor is it necessary for attack analysis device 10 to be realized in a device outside in-vehicle network 20. For example, it is conceivable for attack analysis device 10 to be realized by an integrated ECU included in in-vehicle network 20.

Figure 27:
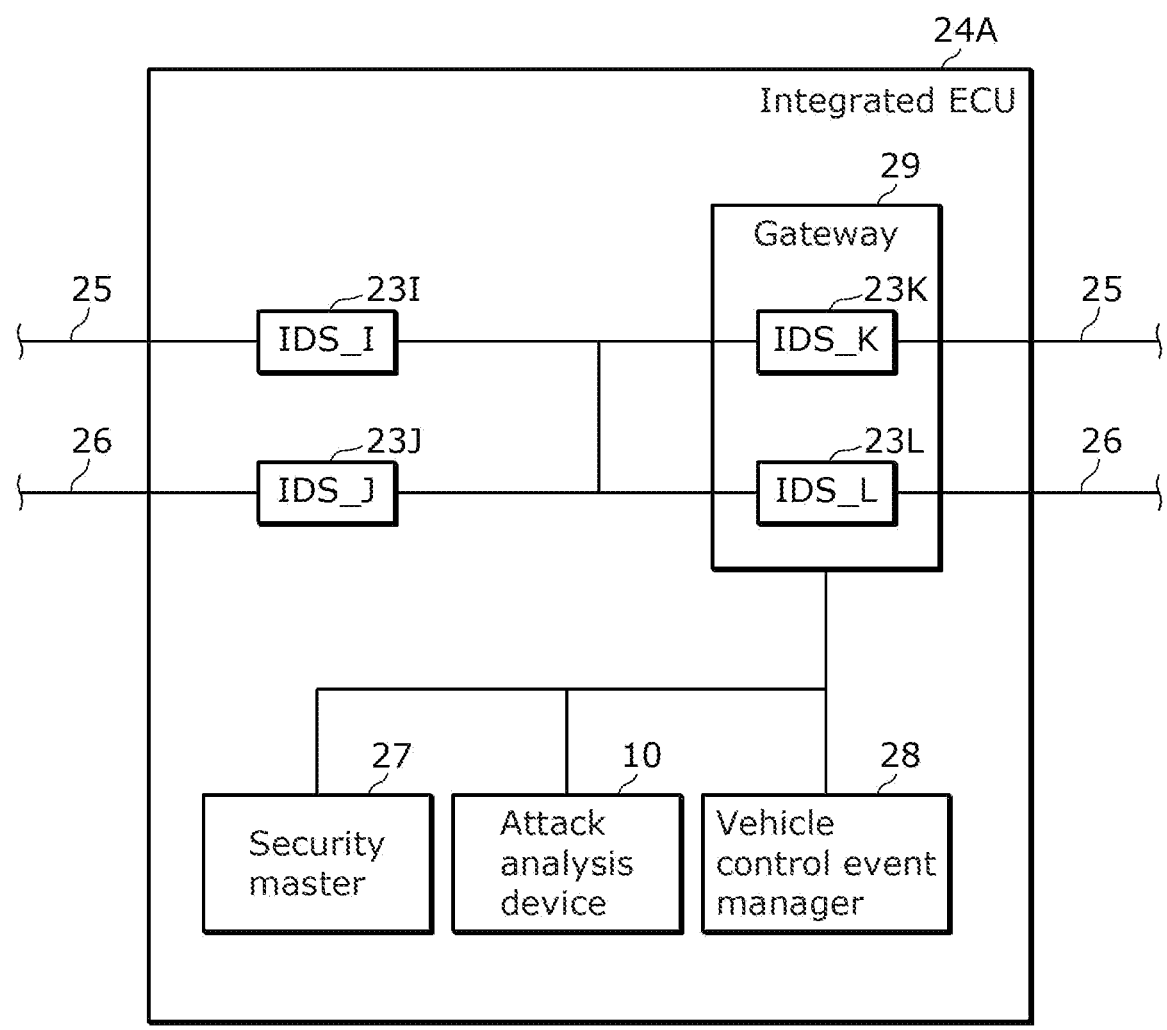
FIG. 27 is a block diagram illustrating an example of the configuration of an integrated ECU according to a variation.

FIG. 27 is a block diagram illustrating an example of the configuration of integrated ECU 24A according to a variation. Integrated ECU 24A is, for example, what is known as a computer device, which includes a processor (not shown) and a memory (not shown), and which realizes attack analysis device 10 by the processor executing a program stored in the memory.

(2) Some or all of the constituent elements included in attack analysis device 10 may be realized by dedicated or general-purpose circuitry.

Some or all of the constituent elements included in attack analysis device 10 may be implemented by a single integrated circuit through system LSI (Large-Scale Integration), for example. "System LSI" refers to very-large-scale integration in which multiple constituent elements are integrated on a single chip, and specifically, refers to a computer system configured including a microprocessor, read-only memory (ROM), random access memory (RAM), and the like. A computer program is stored in the ROM. The system LSI circuit realizes the functions of the devices by the microprocessor operating in accordance with the computer program.

Note that although the term "system LSI" is used here, other names, such as IC, LSI, super LSI, ultra LSI, and so on may be used, depending on the level of integration. Furthermore, the manner in which the circuit integration is achieved is not limited to LSI, and it is also possible to use a dedicated circuit or a generic processor. It is also possible to employ a Field Programmable Gate Array (FPGA) which is programmable after the LSI circuit has been manufactured, or a reconfigurable processor in which the connections and settings of the circuit cells within the LSI circuit can be reconfigured.

Furthermore, if other technologies that improve upon or are derived from semiconductor technology enable integration technology to replace LSI circuits, then naturally it is also possible to integrate the function blocks using that technology. Biotechnology applications are one such foreseeable example.

(3) Rather than attack analysis device 10, one aspect of the present disclosure may be an attack analysis method that implements the characteristic constituent elements included in attack analysis device 10 as steps. Additionally, aspects of the present disclosure may be realized as a computer program that causes a computer to execute the characteristic steps included in the attack analysis method. Furthermore, aspects of the present disclosure may be realized as a computer-readable non-transitory recording medium in which such a computer program is recorded.

INDUSTRIAL APPLICABILITY

The present disclosure can be widely used in attack analysis devices that analyze cyber attacks on a network.

The invention claimed is:

1. An attack analysis device comprising:
a processor; and
a memory storing a program, wherein, when the program is executed by the processor, the program causes the processor to:

obtain in-vehicle network information indicating a configuration of an in-vehicle network including a plurality of external communication interfaces and a plurality of control Electronic Control Units (ECUs), and anomaly detection information indicating a result of detecting an anomaly in at least one node in the in-vehicle network;

estimator that estimate, based on the in-vehicle network information and the anomaly detection information, estimates an attack path in an attack on the in-vehicle network, the attack path including an entry point indicating an external communication interface that is a point of intrusion into the in-vehicle network in the attack and an attack target indicating a control ECU that is a target of the attack; and output the attack path, wherein, in the obtaining, an external communication event history and a vehicle control event history are further obtained, the external communication event history indicating a history of communication events between the in-vehicle network and outside the in-vehicle network, and including, for each of the communication events, a risk indicating a degree of risk of a cyber attack stemming from the communication event, the vehicle control event history indicating a history of vehicle control events by a vehicle in which the in-vehicle network is installed, and including, for each of the vehicle control events, a risk indicating a severity of threat to safety of the vehicle in a case where the vehicle control event is a result of a cyber attack, when the program is executed by the processor, the program further causes the processor to:

estimate the entry point based on the in-vehicle network information, the anomaly detection information, and the external communication event history; and estimate the attack target based on the in-vehicle network information, the anomaly detection information, and the vehicle control event history, in the estimating of the attack path, the attack path is estimated based on the entry point estimated in the estimating of the entry point and the attack target estimated in the estimating of the attack target;

in the outputting, a display control signal including the attack path is outputted to a display device, the display control signal controlling the display device to display a configuration diagram indicating the configuration of the in-vehicle network and display the attack path using a different method from a method used to display another path of the configuration diagram.

2. The attack analysis device according to claim 1, wherein, in the estimating of the entry point, for each of the plurality of external communication interfaces, an entry point risk indicating a confidence level of each of the plurality of external communication interfaces being the entry point is calculated, and the entry point is estimated based on each entry point risk calculated, and for each of the plurality of control ECUs, an attack target risk indicating a confidence level of each of the plurality of control ECUs being the attack target is calculated, and the attack target is estimated based on each attack target risk calculated.

3. The attack analysis device according to claim 2, further comprising:

when the program is executed by the processor, the program further causes the processor to:

calculate, based on the entry point risk of the entry point calculated in the estimating of the entry point and the attack target risk of the attack target calculated in the estimating of the attack target, an attack path confidence level indicating a confidence level of the attack path estimated being the attack path, wherein in the outputting, the attack path confidence level is further outputted.

4. An attack analysis method executed by a computer, the attack analysis method comprising:

obtaining in-vehicle network information indicating a configuration of an in-vehicle network including a plurality of external communication interfaces and a plurality of control ECUs, and anomaly detection information indicating a result of detecting an anomaly in at least one node in the in-vehicle network;

estimating, based on the in-vehicle network information and the anomaly detection information, an attack path in an attack on the in-vehicle network, the attack path including an entry point indicating an external communication interface that is a point of intrusion into the in-vehicle network in the attack and an attack target indicating a control ECU that is a target of the attack; and outputting the attack path, wherein, in the obtaining, an external communication event history and a vehicle control event history are further obtained, the external communication event history indicating a history of communication events between the in-vehicle network and outside the in-vehicle network, and including, for each of the communication events, a risk indicating a degree of risk of a cyber attack stemming from the communication event, the vehicle control event history indicating a history of vehicle control events by a vehicle in which the in-vehicle network is installed, and including, for each of the vehicle control events, a risk indicating a severity of threat to safety of the vehicle in a case where the vehicle control event is a result of a cyber attack, the attack analysis method further comprises:

estimating the entry point based on the in-vehicle network information, the anomaly detection information, and the external communication event history; and estimating the attack target based on the in-vehicle network information, the anomaly detection information, and the vehicle control event history, in the estimating of the attack path, the attack path is estimated based on the entry point estimated in the estimating of the entry point and the attack target estimated in the estimating of the attack target, and in the outputting, a display control signal including the attack path is outputted to a display device, the display control signal controlling the display device to display a configuration diagram indicating the configuration of the in-vehicle network and display the attack path using a different method from a method used to display another path of the configuration diagram.

5. A non-transitory computer-readable recording medium having recorded thereon a program for causing a computer to execute attack analysis processing, the attack analysis processing comprising:

obtaining in-vehicle network information indicating a configuration of an in-vehicle network including a plurality of external communication interfaces and a plurality of control ECUs, and anomaly detection information indicating a result of detecting an anomaly in at least one node in the in-vehicle network;

estimating, based on the in-vehicle network information and the anomaly detection information, an attack path in an attack on the in-vehicle network, the attack path including an entry point indicating an external communication interface that is a point of intrusion into the in-vehicle network in the attack and an attack target indicating a control ECU that is a target of the attack; and outputting the attack path, wherein, in the obtaining, an external communication event history and a vehicle control event history are further obtained, the external communication event history indicating a history of communication events between the in-vehicle network and outside the in-vehicle network, and including, for each of the communication events, a risk indicating a degree of risk of a cyber attack stemming from the communication event, the vehicle control event history indicating a history of vehicle control events by a vehicle in which the in-vehicle network is installed, and including, for each of the vehicle control events, a risk indicating a severity of threat to safety of the vehicle in a case where the vehicle control event is a result of a cyber attack, the attack analysis processing further comprises:

estimating the entry point based on the in-vehicle network information, the anomaly detection information, and the external communication event history; and estimating the attack target based on the in-vehicle network information, the anomaly detection information, and the vehicle control event history, in the estimating of the attack path, the attack path is estimated based on the entry point estimated in the estimating of the entry point and the attack target estimated in the estimating of the attack target, and in the outputting, a display control signal including the attack path is outputted to a display device, the display control signal controlling the display device to display a configuration diagram indicating the configuration of the in-vehicle network and display the attack path using a different method from a method used to display another path of the configuration diagram.

* * * * *